(12) United States Patent
Khajeh et al.

(10) Patent No.: US 11,366,552 B2
(45) Date of Patent: Jun. 21, 2022

(54) ULTRASONIC POLARIZER

(71) Applicant: Apple Inc., Cupertino, CA (US)

(72) Inventors: Ehsan Khajeh, San Jose, CA (US); Aaron Scott Tucker, Cupertino, CA (US); Brian Michael King, Saratoga, CA (US); Marcus Yip, San Carlos, CA (US)

(73) Assignee: Apple, Inc., Cupertino, CA (US)

( * ) Notice: Subject to any disclaimer, the term of this patent is extended or adjusted under 35 U.S.C. 154(b) by 362 days.

(21) Appl. No.: 16/268,886

(22) Filed: Feb. 6, 2019

(65) Prior Publication Data

US 2019/0243047 A1 Aug. 8, 2019

Related U.S. Application Data

(60) Provisional application No. 62/627,173, filed on Feb. 6, 2018, provisional application No. 62/627,174, filed on Feb. 6, 2018.

(51) Int. Cl.
*G06F 3/043* (2006.01)
*G06F 3/041* (2006.01)

(52) U.S. Cl.
CPC .......... *G06F 3/0436* (2013.01); *G06F 3/0416* (2013.01)

(58) Field of Classification Search
CPC ... G06F 3/0436; G06F 3/0416; G02B 5/3041; G02B 5/30
See application file for complete search history.

(56) References Cited

U.S. PATENT DOCUMENTS

| | | | |
|---|---|---|---|
| 3,673,327 A | 6/1972 | Johnson |
| 4,506,354 A | 3/1985 | Hansen |
| 4,746,914 A | 5/1988 | Adler |
| 4,825,212 A | 4/1989 | Adler |
| 5,483,261 A | 1/1996 | Yasutake |
| 5,488,204 A | 1/1996 | Mead et al. |

(Continued)

FOREIGN PATENT DOCUMENTS

| | | |
|---|---|---|
| JP | 2000163031 A | 6/2000 |
| JP | 2002342033 A | 11/2002 |
| WO | 2005103872 A2 | 11/2005 |

OTHER PUBLICATIONS

Lee, S.K. et al. (Apr. 1985). "A Multi-Touch Three Dimensional Touch-Sensitive Tablet," Proceedings of CHI: ACM Conference on Human Factors in Computing Systems, pp. 21-25.

(Continued)

*Primary Examiner* — Towfiq Elahi
(74) *Attorney, Agent, or Firm* — Kubota & Basol LLP

(57) ABSTRACT

A polarizer disposed between a transducer and a surface in which acoustic waves propagate can be used to filter out certain types of acoustic energy. For example, the polarizer can be used with a shear-polarized transducer to pass shear waves and filter out compressional waves that may interact with water, thereby improving water rejection. In some examples, the polarizer can include one or more layers of piezoelectric material with a poling direction different than (e.g., orthogonal to) the poling direction of the transducer. Energy of compressional waves may be extracted by one or more external electric circuits. In some examples, the polarizer can be a magneto-elastic polarizer. In some examples, the polarizer can be a mechanical polarizer.

20 Claims, 15 Drawing Sheets

(56) References Cited

U.S. PATENT DOCUMENTS

| | | |
|---|---|---|
| 5,591,945 A | 1/1997 | Kent |
| 5,766,493 A | 6/1998 | Shin |
| 5,816,225 A | 10/1998 | Koch et al. |
| 5,825,352 A | 10/1998 | Bisset et al. |
| 5,835,079 A | 11/1998 | Shieh |
| 5,854,450 A | 12/1998 | Kent |
| 5,880,411 A | 3/1999 | Gillespie et al. |
| 6,078,315 A | 6/2000 | Huang |
| 6,091,406 A | 7/2000 | Kambara |
| 6,188,391 B1 | 2/2001 | Seely et al. |
| 6,225,985 B1 | 5/2001 | Armstrong |
| 6,229,529 B1 | 5/2001 | Yano |
| 6,310,610 B1 | 10/2001 | Beaton et al. |
| 6,323,846 B1 | 11/2001 | Westerman et al. |
| 6,327,011 B2 | 12/2001 | Kim |
| 6,690,387 B2 | 2/2004 | Zimmerman et al. |
| 6,856,259 B1 | 2/2005 | Sharp |
| 7,015,894 B2 | 3/2006 | Morohoshi |
| 7,079,118 B2 | 7/2006 | Benard |
| 7,098,891 B1 | 8/2006 | Pryor |
| 7,184,064 B2 | 2/2007 | Zimmerman et al. |
| 7,434,467 B2 | 10/2008 | Huebschen |
| 7,489,308 B2 | 2/2009 | Blake |
| 7,499,039 B2 | 3/2009 | Roberts |
| 7,573,466 B1 | 8/2009 | Marzen |
| 7,663,607 B2 | 2/2010 | Hotelling et al. |
| 7,907,129 B2 | 3/2011 | Idzik |
| 8,169,404 B1 | 5/2012 | Boillot |
| 8,264,126 B2 | 9/2012 | Toda |
| 8,479,122 B2 | 7/2013 | Hotelling et al. |
| 8,556,030 B2 | 10/2013 | Scholz |
| 8,743,091 B2 | 6/2014 | Bernstein |
| 9,065,038 B2 | 6/2015 | Pavlakovic |
| 9,713,825 B2 | 7/2017 | Toda |
| 2002/0126104 A1* | 9/2002 | Knowles ............... H03K 17/964 345/177 |
| 2004/0164970 A1 | 8/2004 | Benard |
| 2005/0017959 A1 | 1/2005 | Kraus |
| 2005/0052432 A1 | 3/2005 | Kraus |
| 2005/0083313 A1 | 4/2005 | Hardie-bick |
| 2005/0248548 A1 | 11/2005 | Tsumura |
| 2006/0026521 A1 | 2/2006 | Hotelling et al. |
| 2006/0097991 A1 | 5/2006 | Hotelling et al. |
| 2006/0197753 A1 | 9/2006 | Hotelling |
| 2007/0081681 A1* | 4/2007 | Yu ....................... H04R 17/005 381/190 |
| 2007/0211031 A1 | 9/2007 | Marc |
| 2007/0240913 A1 | 10/2007 | Schermerhorn |
| 2008/0059761 A1 | 3/2008 | Norman |
| 2008/0114251 A1 | 5/2008 | Weymer |
| 2008/0266266 A1 | 10/2008 | Kent |
| 2010/0026667 A1 | 2/2010 | Bernstein |
| 2011/0251490 A1 | 10/2011 | Aharoni |
| 2017/0262099 A1* | 9/2017 | Nathan ................. G06F 3/0446 |
| 2018/0229267 A1* | 8/2018 | Ono ....................... B06B 1/0611 |
| 2020/0122196 A1* | 4/2020 | Kobrin ................. B06B 1/0629 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Final Office Action dated Feb. 20, 2013, for U.S. Appl. No. 12/184,232, filed Jul. 31, 2008, 24 pages.

Final Office Action dated Aug. 27, 2013, for U.S. Appl. No. 12/184,232, filed Jul. 31, 2008, 25 pages.

Non-Final Office Action dated Nov. 18, 2011, for U.S. Appl. No. 12/184,232, filed Jul. 31, 2008, 21 pages.

Non-Final Office Action dated Jul. 25, 2012, for U.S. Appl. No. 12/184,232, filed Jul. 31, 2008, 18 pages.

Notice of Allowance dated Mar. 14, 2014, for U.S. Appl. No. 12/184,232, filed Jul. 31, 2008, eight pages.

\* cited by examiner

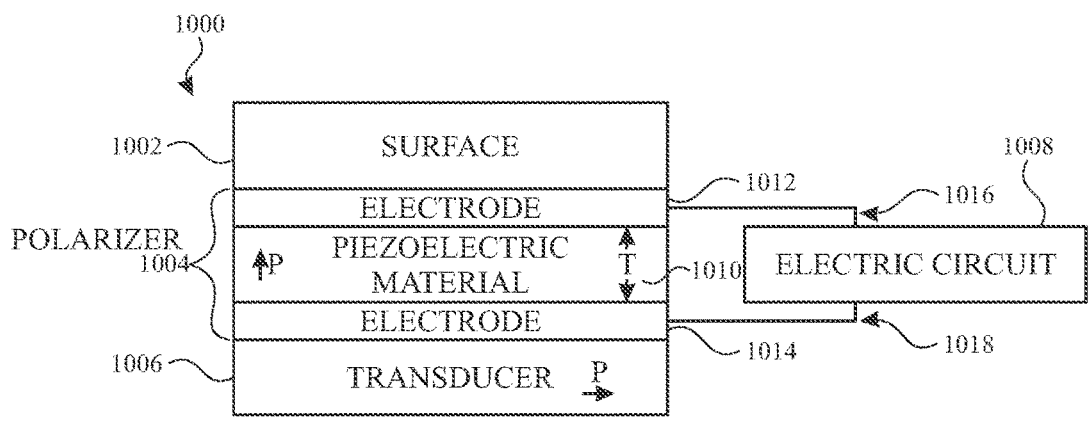
FIG. 10A
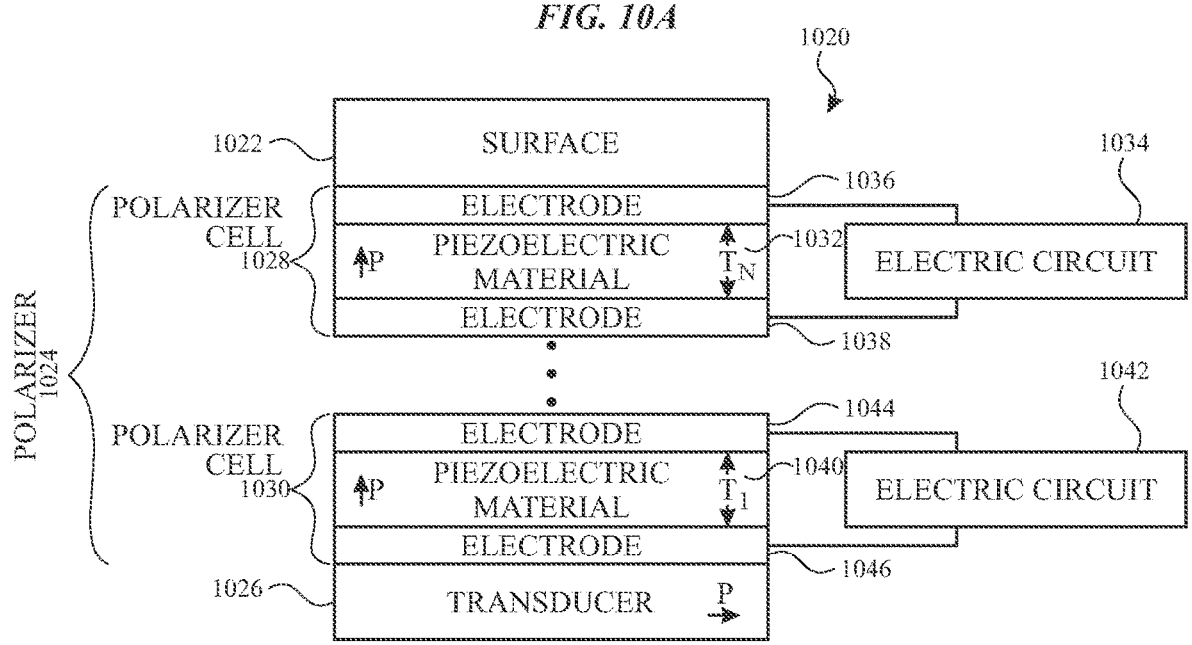
FIG. 10B
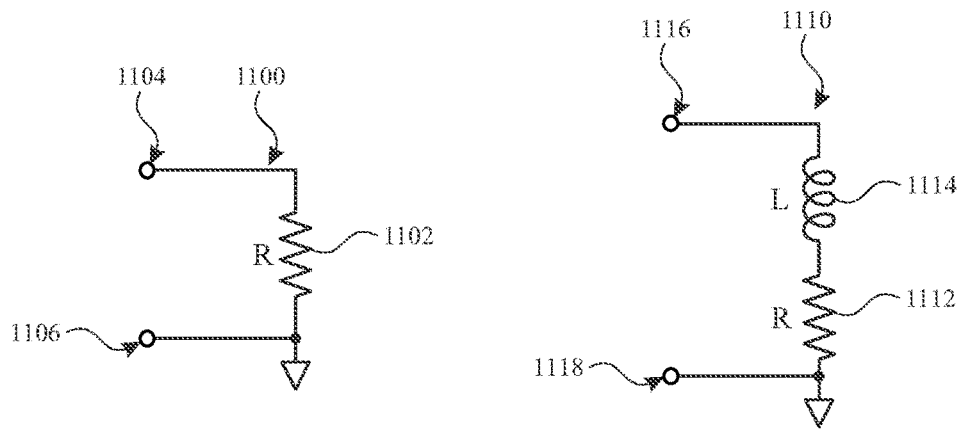
FIG. 11A
FIG. 11B

ULTRASONIC POLARIZER

CROSS-REFERENCE TO RELATED APPLICATIONS

This application claims benefit of U.S. Provisional Application No. 62/627,173, filed Feb. 6, 2018, and U.S. Provisional Application No. 62/627,174, filed Feb. 6, 2018, the entire disclosures of which are incorporated herein by reference for all purposes.

FIELD OF THE DISCLOSURE

This relates generally to acoustic touch sensing, and more particularly, to polarizers for transducers for acoustic touch sensing.

BACKGROUND OF THE DISCLOSURE

Many types of input devices are presently available for performing operations in a computing system, such as buttons or keys, mice, trackballs, joysticks, touch sensor panels, touch screens and the like. Touch screens are particularly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface. Capacitive-type touch sensing systems, however, can experience reduced performance due to floating objects (e.g., water droplets) in contact with the touch-sensitive surface.

SUMMARY

This relates to polarizers for use in an acoustic touch sensing system to improve performance of the acoustic touch sensing system. Acoustic touch sensing systems can utilize one or more transducers coupled to a surface of a device, such as piezoelectric transducers, to transmit ultrasonic waves along a surface and/or through the thickness of an electronic device. As the transmitted wave propagates along the surface, one or more objects (e.g., finger, stylus, etc.) in contact with the surface can interact with the transmitted wave causing a reflection of at least a portion of the transmitted wave, which can be received by the transducers. Portions of the transmitted wave energy after interaction with the one or more objects can be measured to determine the touch location(s) of the one or more objects on the surface of the device (e.g., using time-of-flight (TOF) techniques). In some examples, an acoustic touch sensing system can be configured to be insensitive to contact on the device surface by water, by using shear acoustic waves, for example. Thus, an acoustic touch sensing can be used for touch sensing in devices that are likely to become wet or fully submerged in water. A polarizer disposed between the transducer and the surface in which the shear acoustic waves propagate can be used to filter compressional waves that may interact with water, thereby improving water rejection by the acoustic touch sensing system.

In some examples, the polarizer can include one or more layers of piezoelectric material with a poling direction different than (e.g., orthogonal to) the poling direction of the transducer. Mechanical energy of compressional waves interacting with the one or more layers of piezoelectric material may be converted to electrical energy which may be extracted by one or more external electric circuits to dissipate the energy as heat (or to feed the energy back into the system at a different phase to cancel the incoming compressional wave). In some examples, the polarizer may be formed of a magnetic material that can generate eddy currents to dissipate undesired acoustic energy.

Additionally or alternatively, in some examples, the polarizer can be or include a multi-layer structure including at least a first layer of a first type of material of a first thickness and a second layer of a second type of material of second thickness. The types of materials, number of layers, and thicknesses of the layers can be tuned to filter out a first type of acoustic wave (e.g., a compressional wave) and pass a second type of acoustic wave (e.g., a shear wave).

BRIEF DESCRIPTION OF THE DRAWINGS

FIG. 10A illustrates an exemplary stack-up of an acoustic touch sensing system including a polarizer with a layer of piezoelectric material according to examples of the disclosure.

FIG. 10B illustrates an exemplary stack-up of an acoustic touch sensing system including a polarizer with multiple layers of piezoelectric material according to examples of the disclosure.

FIGS. 11A and 11B illustrate exemplary electric circuits for use with an exemplary polarizer according to examples of the disclosure.

DETAILED DESCRIPTION

Figure 1A:
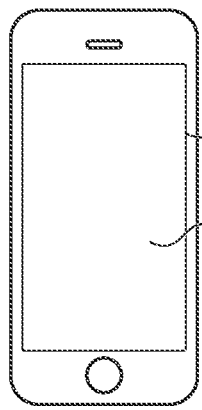
FIGS. 1A-1E illustrate exemplary electronic devices that can include an acoustic touch sensing system according to examples of the disclosure.

In the following description of various examples, reference is made to the accompanying drawings which form a part hereof, and in which it is shown by way of illustration specific examples that can be practiced. It is to be understood that other examples can be used and structural changes can be made without departing from the scope of the various examples.

This relates to polarizers for use in an acoustic touch sensing system to improve performance of the acoustic touch sensing system. Acoustic touch sensing systems can utilize one or more transducers coupled to a surface of a device, such as piezoelectric transducers, to transmit ultrasonic waves along a surface and/or through the thickness of an electronic device. As the transmitted wave propagates along the surface, one or more objects (e.g., finger, stylus, etc.) in contact with the surface can interact with the transmitted wave causing a reflection of at least a portion of the transmitted wave, which can be received by the transducers. Portions of the transmitted wave energy after interaction with the one or more objects can be measured to determine the touch location(s) of the one or more objects on the surface of the device (e.g., using time-of-flight (TOF) techniques). In some examples, an acoustic touch sensing system can be configured to be insensitive to contact on the device surface by water, by using shear acoustic waves, for example. Thus, an acoustic touch sensing can be used for touch sensing in devices that are likely to become wet or fully submerged in water. A polarizer disposed between the transducer and the surface in which the shear acoustic waves propagate can be used to filter compressional waves that may interact with water, thereby improving water rejection by the acoustic touch sensing system.

In some examples, the polarizer can include one or more layers of piezoelectric material with a poling direction different than (e.g., orthogonal to) the poling direction of the transducer. Mechanical energy of compressional waves interacting with the one or more layers of piezoelectric material may be converted to electrical energy which may be extracted by one or more external electric circuits to dissipate the energy as heat (or to feed the energy back into the system at a different phase to cancel the incoming compressional wave). In some examples, the polarizer may be formed of a magnetic material that can generate eddy currents to dissipate undesired acoustic energy.

Additionally or alternatively, in some examples, the polarizer can be or include a multi-layer structure including at least a first layer of a first type of material of a first thickness and a second layer of a second type of material of second thickness. The types of materials, number of layers, and thicknesses of the layers can be tuned to filter out a first type of acoustic wave (e.g., a compressional wave) and pass a second type of acoustic wave (e.g., a shear wave).

Acoustic touch sensing can be used instead of, or in conjunction with, other touch sensing techniques, such as resistive and/or capacitive touch sensing. In some examples, the acoustic touch sensing techniques described herein can be used on a metal housing surface of a device, which may be unsuitable for capacitive or resistive touch sensing due to interference (e.g., of the housing with the capacitive or resistive sensors housed in the metal housing). In some examples, the acoustic touch sensing techniques described herein can be used on a glass or crystal surface of a display or touch screen.

Figure 1B:
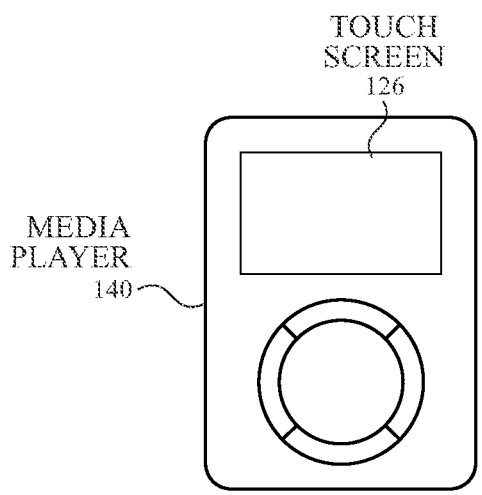
Figure 1C:
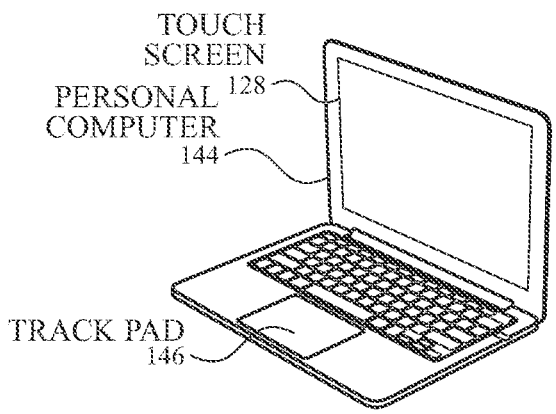
Figure 1D:
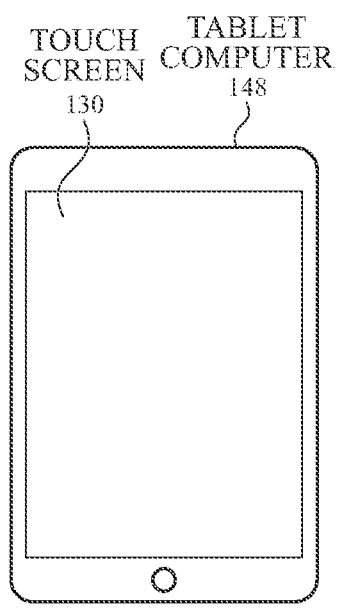
Figure 1E:
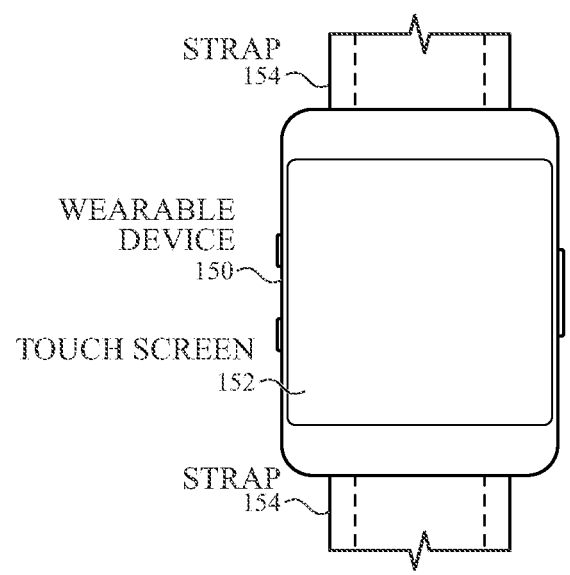

FIGS. 1A-1E illustrate examples of systems with touch screens that can include acoustic sensors for detecting contact between an object (e.g., a finger or stylus) and a surface of the system according to examples of the disclosure. FIG. 1A illustrates an exemplary mobile telephone 136 that includes a touch screen 124 and can include an acoustic touch sensing system according to examples of the disclosure. FIG. 1B illustrates an example digital media player 140 that includes a touch screen 126 and can include an acoustic touch sensing system according to examples of the disclosure. FIG. 1C illustrates an example personal computer 144 that includes a touch screen 128 and a track pad 146, and can include an acoustic touch sensing system according to examples of the disclosure. FIG. 1D illustrates an example tablet computing device 148 that includes a touch screen 130 and can include an acoustic touch sensing system according to examples of the disclosure. FIG. 1E illustrates an example wearable device 150 (e.g., a watch) that includes a touch screen 152 and can include an acoustic touch sensing system according to examples of the disclosure. Wearable device 150 can be coupled to a user via strap 154 or any other suitable fastener. It should be understood that the example devices illustrated in FIGS. 1A-1E are provided by way of example, and other types of devices can include an acoustic touch sensing system for detecting contact between an object and a surface of the device. Additionally, although the devices illustrated in FIGS. 1A-1E include touch screens, in some examples, the devices may have a non-touch-sensitive display.

Acoustic sensors can be incorporated in the above described systems to add acoustic touch sensing capabilities to a surface of the system. For example, in some examples, a touch screen (e.g., capacitive, resistive, etc.) can be augmented with acoustic sensors to provide a touch sensing capability for use in wet environments or under conditions where the device may get wet (e.g., exercise, swimming, rain, washing hands). In some examples, an otherwise non-touch sensitive display screen can be augmented with acoustic sensors to provide a touch sensing capability. In such examples, a touch screen can be implemented without the stack-up required for a capacitive touch screen. In some examples, the acoustic sensors can be used to provide touch sensing capability for a non-display surface. For example, the acoustic sensors can be used to provide touch sensing capabilities for a track pad 146, a button, a scroll wheel, part or all of the housing or any other surfaces of the device (e.g., on the front, rear or sides).

Figure 2A:
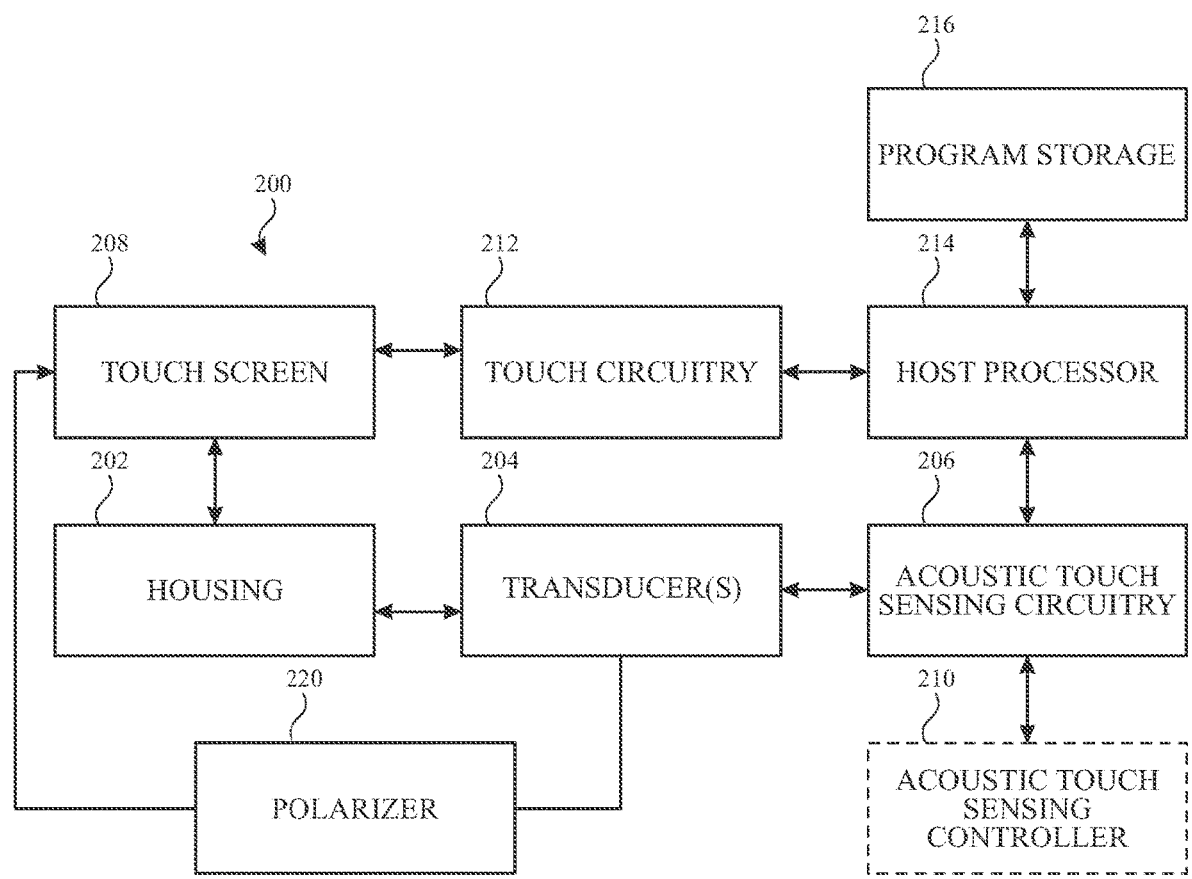
FIG. 2A illustrates an exemplary block diagram of an electronic device including an acoustic touch sensing system according to examples of the disclosure.

FIG. 2A illustrates an exemplary block diagram of an electronic device including an acoustic touch sensing system according to examples of the disclosure. In some examples, housing 202 of device 200 (e.g., mobile telephone 136, digital media player 140, personal computer 144, tablet computing device 148, wearable device 150) can be coupled with one or more acoustic transducers 204. In some examples, transducers 204 can be piezoelectric transducers, which can be made to vibrate by the application of electrical signals when acting as a transmitter, and generate electrical signals based on detected vibrations when acting as a receiver. In some examples, the transducers 204 can be formed from a piezoelectric ceramic material (e.g., PZT or KNN) or a piezoelectric plastic material (e.g., PVDF or PLLA). Similarly, transducers 204 can produce electrical energy as an output when vibrated. In some examples, the transducers 204 can be bonded to the housing 202 by a bonding agent (e.g., a thin layer of stiff epoxy). In some examples, the transducers 204 can be deposited on the surface (e.g., a cover glass or front crystal) through processes such as deposition, lithography, or the like. In some examples, the transducers 204 can be bonded to the surface using conductive or non-conductive bonding materials. When electrical energy is applied to the transducers 204 it can cause the transducers to vibrate, the surface material in contact with the transducers can also be caused to vibrate, and the vibrations of the molecules of the surface material can propagate as an acoustic wave through the surface material. In some examples, vibration of the transducers 204 can be used to produce ultrasonic acoustic waves at a selected frequency over a broad frequency range (e.g., 400 kHz–10 MHz) in the medium of the surface of the electronic device which can be metal, plastic, glass, wood, or the like. It should be understood that other frequencies outside of the exemplary range above can be used while remaining within the scope of the present disclosure.

In some examples, transducers 204 can also be partially or completely disposed on (or coupled to) a portion of a touch screen 208. For example, the touch screen 208 (e.g., capacitive) may include a glass panel (cover glass), and a display region of the touch screen may be surrounded by a non-display region (e.g., a black border region surrounding the periphery of the display region of touch screen). In some examples, transducers 204 can be disposed partially or completely in the black mask region of the touch screen 208 glass panel (e.g., on the back side of the glass panel behind the black mask) such that the transducers are not visible (or are only partially visible) to a user.

Device 200 can further include acoustic touch sensing circuitry 206, which can include circuitry for driving electrical signals to stimulate vibration of the transducers 204 (e.g., transmit circuitry), as well as circuitry for sensing electrical signals output by the transducers (e.g., receive circuitry) when the transducer is stimulated by received acoustic energy. In some examples, timing operations for the acoustic touch sensing circuitry 206 can optionally be provided by a separate acoustic touch sensing controller 210 that can control timing of acoustic touch sensing circuitry 206 operations. In some examples, touch sensing controller 210 can be coupled between acoustic touch sensing circuitry 206 and host processor 214. In some examples, controller functions can be integrated with the acoustic touch sensing circuitry 206 (e.g., on a single integrated circuit). Output data from acoustic touch sensing circuitry 206 can be output to a host processor 214 for further processing to determine a location of an object contacting the device as will be described in more detail below. In some examples, the processing for determining location of a contacting object can be performed by the acoustic touch sensing circuitry 206, controller 210 or a separate sub-processor of device 200 (not shown).

In some examples, a polarizer 220 can be disposed between a transducer 204 and the surface in which the acoustic waves propagate. In some examples, shear horizontal acoustic waves can be generated by transducer 204 so as to not interact with water on the surface. Discontinuous boundary conditions between the transducer 204 and the surface (in the absence of polarizer 220) can also cause the generation of compressional waves, such as Lamb waves, which may interact with water. The polarizer 220 can be designed to filter out compressional waves, such as Lamb waves, to transmit acoustic energy into the surface or receive acoustic energy reflected back from the surface primarily or only in shear modes. It should be understood that although examples described here focus on primarily on passing shear horizontal acoustic waves and stopping (e.g., absorbing or attenuating) compressional acoustic waves, the polarizer 220 can be designed to pass acoustic waves having a first displacement field direction and stopping acoustic waves having a second displacement field direction different from the first displacement field direction.

In addition to acoustic touch sensing, the device can include additional touch circuitry 212 and optionally a touch controller (not shown) that can be coupled to the touch screen 208. In examples including a touch controller, the touch controller can be disposed between the touch circuitry 212 and the host processor 214. The touch circuitry 212 can, for example, be capacitive or resistive touch sensing circuitry, and can be used to detect contact and/or hovering of objects (e.g., fingers, styli) in contact with and/or in proximity to the touch screen 208, particularly in the display region of the touch screen. Thus, device 200 can include multiple types of sensing circuitry (e.g., touch circuitry 212 and acoustic touch sensing circuitry 206) for detecting objects (and their positions) in different regions of the device and/or for different purposes, as will be described in more detail below. Although described herein as including a touch screen, it should be understood that touch circuitry 212 can be omitted and touch screen 208 can be replaced by an otherwise non-touch-sensitive display (e.g., but-for the acoustic sensors).

Host processor 214 can receive acoustic or other touch outputs (e.g., capacitive) and perform actions based on the touch outputs. Host processor 214 can also be connected to program storage 216 and touch screen 208. Host processor 214 can, for example, communicate with touch screen 208 to generate an image on touch screen 208, such as an image of a user interface (UI), and can use touch sensing circuitry 212 and/or acoustic touch sensing circuitry 206 (and, in some examples, their respective controllers) to detect a touch on or near touch screen 208, such as a touch input to the displayed UI. The touch input can be used by computer programs stored in program storage 216 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 214 can also perform additional functions that may not be related to touch processing.

Note that one or more of the functions described herein can be performed by firmware stored in memory and executed by the touch circuitry 212 and/or acoustic touch sensing circuitry 206 (or their respective controllers), or stored in program storage 216 and executed by host processor 214. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that device 200 is not limited to the components and configuration of FIG. 2A, but can include other or additional components in multiple configurations according to various examples. Additionally, the components of device 200 can be included within a single device, or can be distributed between multiple devices. Additionally, it should be understood that the connections between the components is exemplary and different unidirectional or bidirectional connections can be included between the components depending on the implementation, irrespective of the arrows shown in the configuration of FIG. 2A.

Figure 2B:
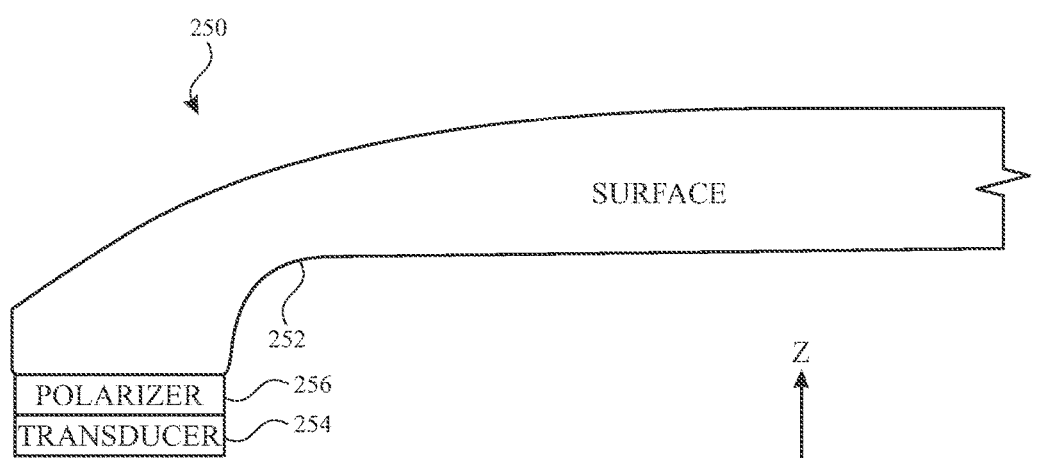
FIG. 2B illustrates an exemplary stack-up of an exemplary electronic device including an acoustic touch sensing system according to examples of the disclosure.

FIG. 2B illustrates an exemplary stack-up of an exemplary electronic device including an acoustic touch sensing system according to examples of the disclosure. The electronic device (e.g., mobile telephone 136, digital media player 140, personal computer 144, tablet computing device 148, wearable device 150) can include a stack-up 250 that includes a surface 252 in which acoustic waves can propagate, a transducer 254 (e.g., corresponding to one of transducers 204) and a polarizer 256 (e.g., corresponding to polarizer 220). In some examples, surface 252 can be a cover glass or front crystal of a touch screen (e.g., touch screen 208). In some examples, transducer 254 can be shear-polarized piezoelectric material primarily generating shear horizontal waves when stimulated that can propagate into surface 252 (e.g., in the z-direction) while its vibration or displacement can be in-plane with respect to surface 252 (e.g., in the x-y plane). The shear horizontal waves can be reflected due to a finger or other object touching surface 252, but not when water or other liquids are in contact with surface 252 due to in-plane displacement of shear horizontal waves. As a result, an acoustic touch sensing system using shear horizontal waves can be water (or other liquid) agnostic. In some examples, transducer 254 can also generate parasitic waves (which can be reflected due to water on the surface), such as compressional waves or Lamb waves, at its corners due to discontinuous boundary conditions. Compressional waves can propagate into surface 252 (e.g., in the z-direction) while its vibration or displacement can be out-of-plane with respect to surface 252 (e.g., also in the z-direction) Polarizer 254 can be designed to filter out compressional waves or Lamb waves and pass shear horizontal waves.

Figure 3A:
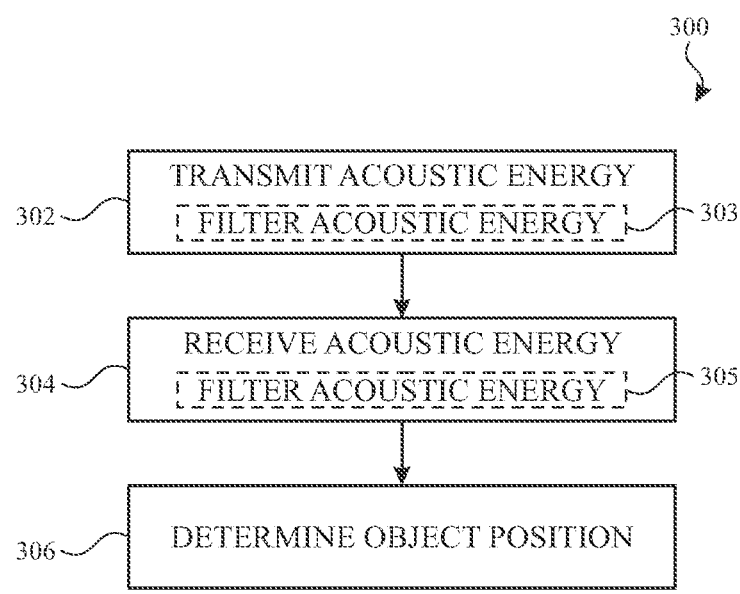
FIG. 3A illustrates an exemplary method for acoustic touch sensing to determine a position of an object in contact with a surface according to examples of the disclosure.

FIG. 3A illustrates an exemplary method 300 for acoustic touch sensing of an object contact position according to examples of the disclosure. At 302, acoustic energy can be transmitted (e.g., by one or more transducers 204) along a surface of a device in the form of an ultrasonic wave, for example. In some examples, the wave can propagate as a compressive wave, a shear horizontal wave, a Rayleigh wave, a Lamb wave, a Love wave, a Stonely wave, or a surface acoustic wave. Other propagation modes for the transmitted acoustic energy can also exist based on the properties of the surface material and the manner of energy transmission from the transducers to the surface of the device. In some examples, the surface can be formed from glass or sapphire crystal (e.g., touch screen 208) or the surface can formed from metal, plastic, or wood (e.g., housing 202). Transmitted energy can propagate along the surface until a discontinuity in the surface is reached, which can cause a portion of the energy to reflect. In some examples, a discontinuity can be an irregularity in the shape of the surface (e.g., a groove or pattern etched into the surface). In some examples, a discontinuity can be a reflective material coupled to the surface (e.g., deposited). In some examples, an object in contact with the surface (e.g., a user's finger) can also be a discontinuity. In some examples, a discontinuity can occur at edges of the surface material (e.g., when the ultrasonic wave propagates to the edge of the surface opposite the transducer). When the transmitted energy reaches one of the discontinuities described above, some of the energy can be reflected, and a portion of the reflected energy can be directed to the one or more transducers 204. In some examples, water or other fluids in contact with the surface of the device (e.g., device 200) will not act as a discontinuity to the acoustic waves (e.g., shear horizontal acoustic waves), and thus the acoustic touch sensing method can be effective for detecting the presence of an object (e.g., a user's finger) even in the presence of water drops (or other low-viscosity fluids) on the surface of the device or even while the device is fully submerged.

In some examples, the acoustic energy can be transmitted by one or more transducers 204 into the surface via a polarizer 220. At 303, the acoustic energy generated by the transducers 204 can be filtered by polarizer 220. In some examples, the transducer can be shear-polarized and the acoustic energy generated by the transducer can thereby primarily include shear horizontal waves in order to prevent water or liquids on the surface from generating reflections and being identified as touches. However, as described herein, the acoustic energy generated by the transducer may also include compressional waves, Rayleigh waves, Lamb waves, Love waves, Stonely waves, or surface acoustic waves, some of which may be parasitic in that these waves may interact with water on the surface and be identified as touches. Polarizer 220 can provide a passband at frequencies corresponding to shear waves and a stopband at frequencies corresponding to parasitic modes such as compressional or Lamb waves, for example.

At 304, returning acoustic energy can be received, and the acoustic energy can be converted to an electrical signal by one or more transducers 204. In some examples, the acoustic energy can be received by the one or more transducers 204 from the surface via the polarizer 220. At 305, the acoustic energy received from the surface can be filtered by polarizer 220. In some examples, polarizer 220 can provide a passband at frequencies corresponding to shear waves and a stopband at frequencies corresponding to parasitic modes such as compressional or Lamb waves, for example, so that the acoustic touch sensing system can avoid detecting water or other liquids as touches. At 306, the acoustic touch sensing system can determine whether one or more objects (e.g., fingers) is contacting the surface of the device, and can further detect the position of one or more objects based on the received acoustic energy. In some examples, a distance of the object from the transmission source (e.g., transducers 204) can be determined from a time-of-flight between transmission and reception of reflected energy, and a propagation rate of the ultrasonic wave through the material of the surface (and accounting for the properties of the polarizer). In some examples, baseline reflected energy from one or more intentionally included discontinuities (e.g., barriers, ridges, grooves, etc.) can be compared to a measured value of reflected energy. The baseline reflected energy can be determined during a measurement when no object (e.g., finger) is in contact with the surface. Timing of measured deviations of the reflected energy from the baseline can be correlated with a location of the object. Although method 300, as described above, generally refers to reflected waves received by the transducers that transmitted the waves, in some examples, the transmitter and receiver functions can be separated such that the transmission of acoustic energy at 302 and receiving acoustic energy at 304 may not occur at the same transducer. A polarizer can be included between the surface and both of or either of the transmitter and receiver transducers. Exemplary device configurations and measurement timing examples that can be used to implement method 300 will be described in further detail below.

Figure 3B:
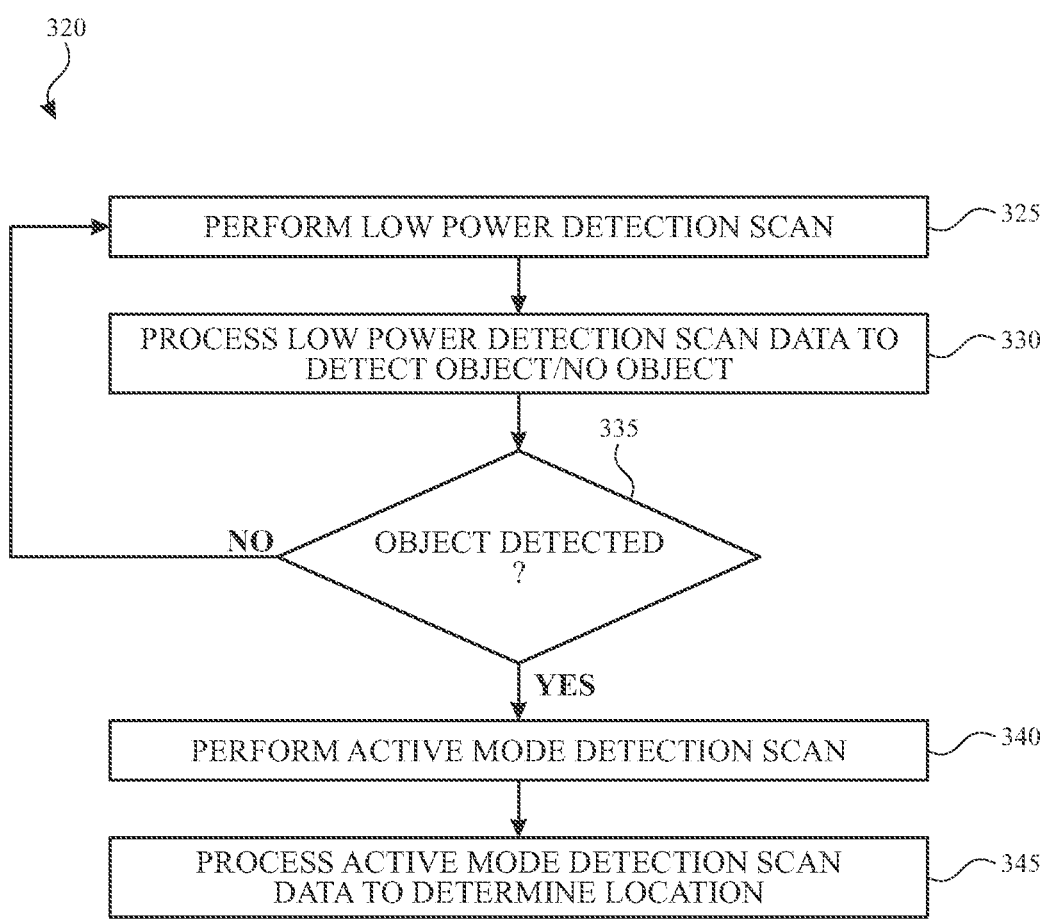
FIG. 3B illustrates an exemplary process for acoustic touch sensing of an object presence and contact position in various modes according to examples of the disclosure.

In some examples, the acoustic touch sensing can be performed differently in different operating modes. For example, the acoustic touch sensing can include a low power mode (e.g., when objects are not detected, when display is turned off) and an active mode (e.g., when an object is detected, when the display is turned on). FIG. 3B illustrates an exemplary process 320 for acoustic touch sensing of an object presence and contact position in various modes (e.g., a low power mode and an active mode) according to examples of the disclosure. At 325, the acoustic touch sensing system can perform a low power detection scan. In some examples, the low power detection scan can include sensing with fewer (in comparison to the active mode scan) of the transducers of the acoustic touch sensing system (e.g., four transducers may be used for the active mode detection scan as described below with respect to FIG. 5A, and fewer than four transducers may be used for the low power detection scan). In some examples, the acoustic touch sensing system can use a single transducer to transmit acoustic waves and receive reflections to determine the presence of an object touching. Additionally or alternatively, in some examples, the low power detection scan can include sensing energy or waves received by one or more transducers for a shorter (in comparison to the active mode scan) period of time. For example, the low power scan can sense the energy or waves for the period of time corresponding to a reflection of an opposite edge of the touch sensing surface (rather than for a period that may include other reflections). Attenuation in the reflected energy or wave corresponding to the opposite edge compared with a no-touch baseline of reflected energy or wave corresponding to the opposite edge can be an indication that an object is touching the surface. Additionally or alternatively, low power detection scan can be performed at a reduced frame rate (e.g., 10 Hz–30 Hz for the low power detection scans rather than 30 Hz–120 Hz for active mode detection scans), thereby reducing the power consumption by the various ADC and DAC components. At 330, the acoustic touch sensing system can process data from the low power detection scan and detect whether an object is or is not touching the surface. When no object is detected on the surface at 335, the acoustic touch sensing system can remain in a low power mode, and continue to perform low power detection scans (in the same or in subsequent scan frames). When an object is detected on the surface at 335, the acoustic touch sensing system can transition into an active mode and, at 340, perform an active mode detection scan. At 345, the data from the active mode detection scan can be processed to determine a location (e.g., centroid) of the object(s) contacting the surface (e.g., as described below with reference to FIG. 5A).

Although process 300 is described as a low power detection scan and an active mode detection scan, it should be understood that process 300 can generally provide a coarse detection scan (e.g., indicating the presence or absence of a touch) and a fine detection scan (e.g., indicating the location of the touch) without limiting the system to low power mode and/or active mode operation.

Figure 4:
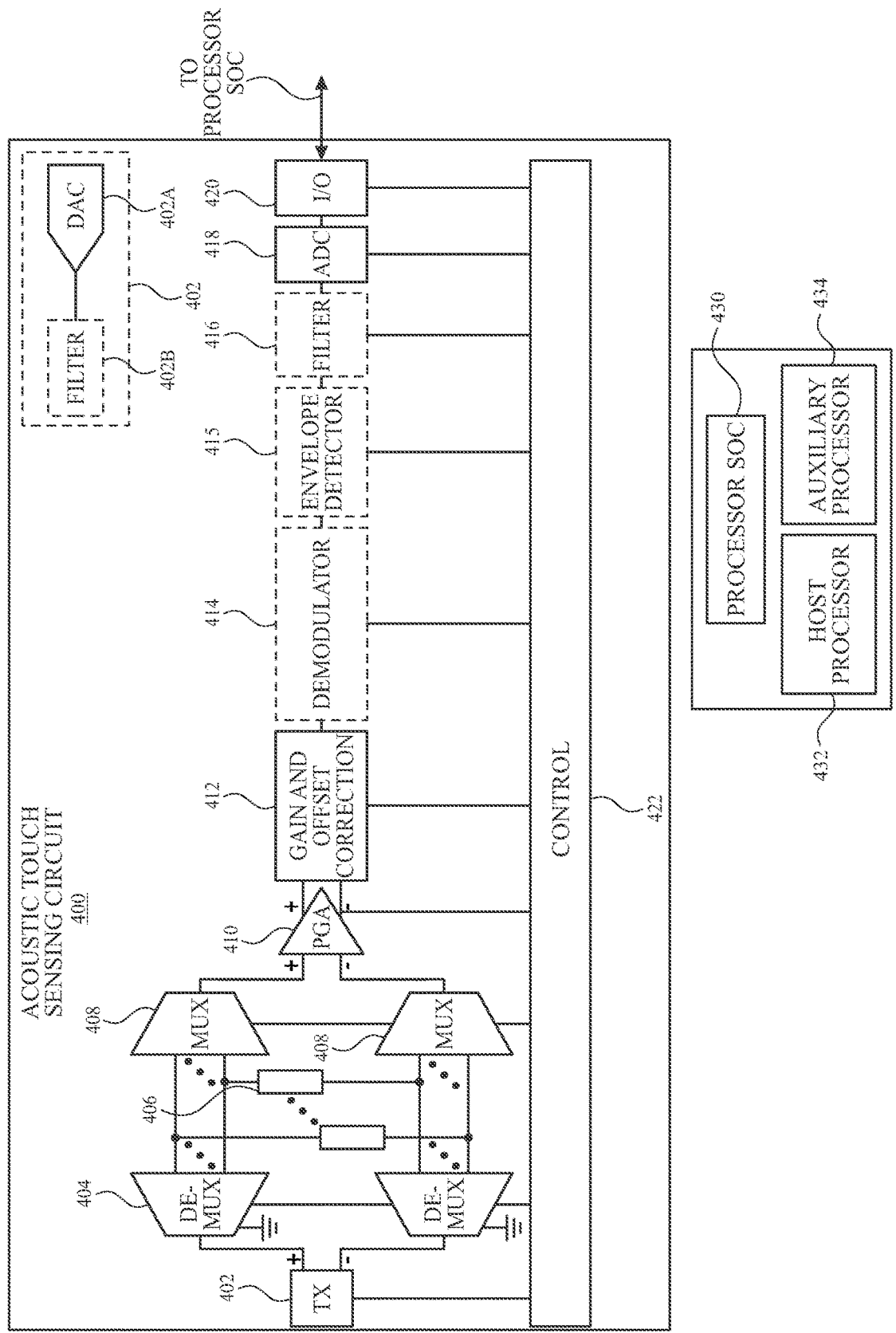
FIG. 4 illustrates an exemplary configuration of an acoustic touch sensing circuit according to examples of the disclosure.

FIG. 4 illustrates an exemplary configuration of an acoustic touch sensing circuit 400 according to examples of the disclosure. Acoustic touch sensing circuit 400 can include acoustic touch sensing circuitry 402-404 and 408-420 (which can correspond to acoustic touch sensing circuitry 206 above) and control logic 422 (which can correspond to acoustic touch sensing controller 210 above). In some examples, acoustic touch sensing circuit 400 can also optionally include transducers 406 (which can correspond to transducers 204 above). In some examples, a transmitter 402 can generate an electrical signal for stimulating movement of one or more of a plurality of transducers 406. In some examples, the transmitted signal can be a differential signal, and in some examples, the transmitted signal can be a single-ended signal. In some examples, transmitter 402 can be a simple buffer, and the transmitted signal can be a pulse (or burst of pulses at a particular frequency). In some examples, transmitter 402 can include a digital-to-analog converter (DAC) 402A and an optional filter 402B that can be optionally used to smooth a quantized output of DAC 402A. In some examples, characteristics of the transducer itself can provide a filtering property and filter 402B can be omitted. DAC 402A can be used to generate an arbitrary transmit waveform. In some examples, the arbitrary waveform can pre-distort the transmit signal to equalize the channel. In some examples, the characteristics of each channel, such as the properties of the surface material coupled to transducers 406, the discontinuities in the surface material, and the reflection characteristics of an edge of the device can be measured and stored. In some examples, the channel characteristics can be measured as a manufacturing step (or factory calibration step), and in other examples the characteristics can be measured as a periodic calibration step (i.e., once a month, once a year, etc. depending on how quickly the channel characteristics are expected to change). In some examples, the channel characteristics can be converted to a transfer function of the channel, and the arbitrary transmit waveform can be configured using the inverse of the channel transfer function such that the returning signal is equalized (e.g., returning signal can be detected as a pulse or a burst of pulses despite the transmitted waveform having a seemingly arbitrary waveform). In some examples, a single differential pulse can be used as a transmit waveform. For example, a bipolar square pulse (where the voltage applied to the transducer can be both positive and negative) can be used as the transmit waveform, and the bipolar square pulse can be implemented using a single-ended or differential implementation.

A pair of demultiplexers 404 (e.g., in a differential implementation) can be used to selectively couple transmitter 402 to one of transducers 406 that can be the active transducer for a particular measurement step in a measurement cycle. In some examples, demultiplexers 404 can have a ground connection, and the non-selected demultiplexer outputs can be shorted, open, or grounded. As described above, transducers 406 can also generate output electrical signals when motion is induced in the transducers by acoustic energy. A pair of multiplexers 408 (e.g., in a differential implementation) can be used to select a transducer 406 for coupling to a programmable gain amplifier 410 configured to amplify the received signals. In some examples, the same transducer 406 can be coupled to transmitter 402 by demultiplexers 404 during the drive mode and coupled to programmable gain amplifier 410 by multiplexers 408 during the receive mode. Thus, a single transducer 406 can be used both for transmitting and receiving acoustic energy. In some examples, a first transducer can be coupled to transmitter 402 by demultiplexers 404 and a second transducer can be coupled by multiplexers 408 to programmable gain amplifier 410. For example, the transmitting transducer and the receiving transducer can be discrete piezoelectric elements, where the transmitting transducer can be designed for being driven by higher voltages (or currents) to produce sufficient motion in transducer 406 to generate an acoustic wave in the surface of a device (e.g., device 200 above), and the receiving transducer can be designed for receiving smaller amplitude reflected energy. In such an architecture, the transmit side circuitry (e.g., 402 and 404) can be optionally implemented on a high voltage circuit, and the receive side circuitry (e.g., 408-420) can be optionally implemented on a separate low voltage circuit. In some examples, multiplexers 408 can also be implemented on the high voltage circuit to properly isolate the remaining receive side circuitry (e.g., 410-420) during transmission operations by transmit side circuitry. Additionally or alternatively, in some examples, the transmit circuit can include an energy recovery architecture that can be used to recover some of the energy required for charging and discharging the transducer. In some examples, the programmable gain amplifier output can be coupled to gain and offset correction circuit 412. It should be understood that for a single-ended implementation, a single demultiplexer 404 and a single multiplexer 408 can be used, and transmitter 402, programmable gain amplifier 410, and the input to gain and offset correction circuit 412 can be single-ended as well. Differential implementations, however, can provide improved noise suppression over a single-ended implementation.

In some examples, the acoustic touch sensing circuit can be used in a system include multiple transmit transducers and one receive transducer. In such examples, demultiplexer 404 can be unnecessary and omitted from the acoustic touch sensing circuit. In some examples, the acoustic touch sensing circuit can be used in a system including multiple receive transducers and one transmit transducer. In such examples, multiplexer 408 can be unnecessary and omitted from the acoustic touch sensing circuit.

In some examples, the output of gain and offset correction circuit 412 can optionally be coupled to one or more analog processing circuits. In some examples, the output of gain and offset correction circuit 412 can be coupled to a demodulation circuit 414 configured to demodulate the received signals (e.g., by I/Q demodulation). In some examples, the output of the gain and offset correction circuit 412 can be coupled to an envelope detection circuit 415 configured to perform envelope detection on the received signals. In some examples, the output of gain and offset correction circuit 412 can be filtered at filter 416. In some examples, these blocks can be placed in a different order. In some examples, the processing of these analog processing circuits can be performed in the digital domain.

The received signals, whether raw or processed by one or more of demodulation circuit 414, envelope detection circuit 415 or filter 416 can be passed to an analog-to-digital converter (ADC) 418 for conversion to a digital signal. In some examples, an input/output (I/O) circuit 420 can be used to transmit received data for processing. In some examples, the output of I/O circuit 420 can be transferred to a host processor of the device, or to an auxiliary processor (sub-processor) separate from the host processor. For example, as illustrated, the output of I/O circuit 420 can be coupled to a processor system-on-chip (SoC) 430, which can include one or more processors. In some examples, processor SoC 430 can include a host processor 432 (e.g., an active mode processor) and an auxiliary processor 434 (e.g., a low power processor). In some examples, some digital signal processing can be performed (e.g., by acoustic touch sensing circuit 400) before transmitting the data to other processors in the system (e.g., processor SoC 430). A control circuit 422 can be used to control timing and operations of the acoustic touch sensing circuitry 402-420. In some examples, the I/O circuit is not only used for data transfer to processor SoC 430 (e.g., host processor 432), but also is used for writing the control registers and/or firmware download from processor SoC 430.

It is to be understood that the configuration of FIG. 4 is not limited to the components and configuration of FIG. 4, but can include other or additional components in multiple configurations according to various examples. Additionally, some or all of the components 402-404 404 and 408-420 can be included in a single circuit, or can be divided among multiple circuits while remaining within the scope of the examples of the disclosure.

Figure 5A:
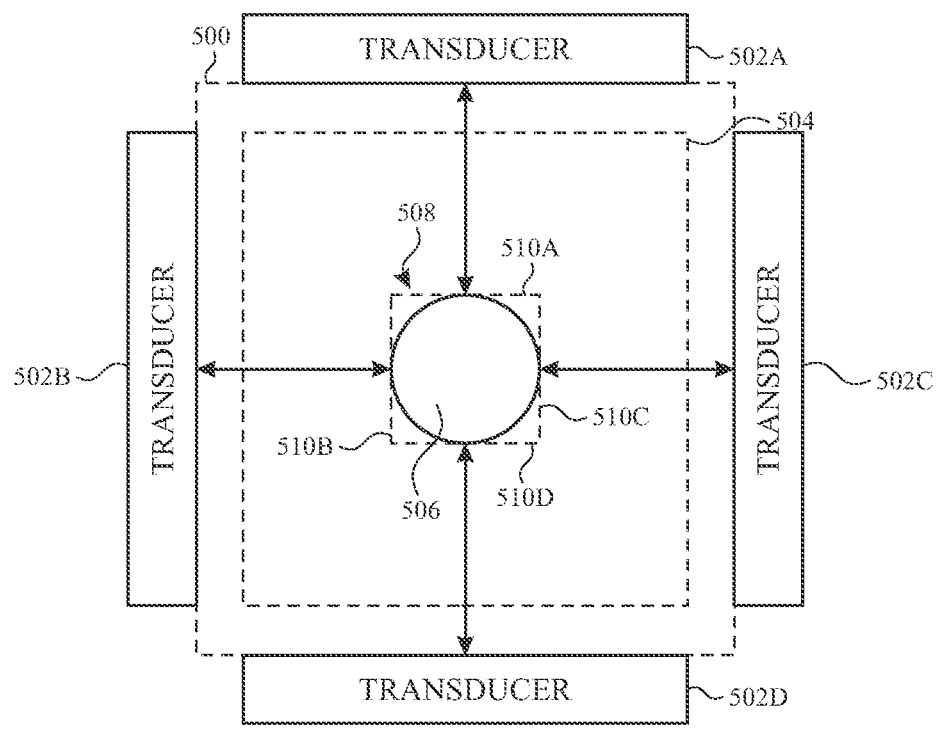
FIGS. 5A-5F illustrate exemplary system configurations and timing diagrams for acoustic touch sensing to determine position using a bounding box technique according to examples of the disclosure.

As described herein, various acoustic sensing techniques can be used to determine position of an object in touching a surface. In some examples, one or more time-of-flight (TOF) measurements can be performed using one or more acoustic transducers to determine boundaries of the position that the object is touching. FIGS. 5A-5F illustrate exemplary system configurations and timing diagrams for acoustic touch sensing to determine position using a bounding box technique according to examples of the disclosure. FIG. 5A illustrates an exemplary acoustic touch sensing system configuration using four acoustic transducers 502A-D mounted along (or otherwise coupled to) four edges of a surface 500 (e.g., cover glass). In some examples, transducers 502A-D can be coupled to the four edges of surface 500 via corresponding polarizers (not shown). Transducers 502A-D can be configured to generate acoustic waves (e.g., shear horizontal waves) and to receive the reflected acoustic waves. Propagation of shear horizontal waves can be unaffected by water on surface 500 because low viscosity fluids and gases (such as water and air) have a very low shear modulus, and therefore do not perturb the boundary conditions that affect wave propagation. Shear horizontal waves can be highly directional waves such that the active detection region (or active area) 504 can be effectively defined based on the position and dimensions of the acoustic transducers 502A-D. It should be understood, however, that active area can change based on the directionality property of the acoustic waves and the size and placement of acoustic transducers 502A-D. Additionally, it should be understood that although illustrated as transmit and receive transducers, in some examples, the transmit and receive functions can be divided (e.g., between two transducers in proximity to one another, rather than one transmit and receive transducer transducer).

The position of a touch 506 from an object in contact with surface 502 can be determined by calculating TOF measurements in a measurement cycle using each of acoustic transducers 502A-D. For example, in a first measurement step of the measurement cycle, acoustic transducer 502A can transmit an acoustic wave and receive reflections from the acoustic wave. When no object is present, the received reflection will be the reflection from the acoustic wave reaching the opposite edge of surface 500. However, when an object is touching surface 500 (e.g., corresponding to touch 506), a reflection corresponding to the object can be received before receiving the reflection from the opposite edge. Based on the received reflection corresponding to the object received at transducer 502A, the system can determine a distance to the edge (e.g., leading edge) of touch 506, marked by boundary line 510A. Similar measurements can be performed by transducers 502B, 502C and 502D to determine a distance to the remaining edges of touch 506, indicated by boundary lines 510B, 510C and 510D. Taken together, the measured distances as represented by boundary lines 510A-510D can form a bounding box 508. In some examples, based on the bounding box, the acoustic touch sensing system can determine the area of the touch (e.g., the area of the bounding box). Based on the bounding box, the acoustic touch sensing system can determine position of touch 506 (e.g., based on a centroid and/or area of the bounding box).

The acoustic touch sensing scan described with reference to FIG. 5A can correspond to the active mode detection scan, described above with reference to FIG. 3B, that can be used to determine the position/location of an object touching the surface.

Figure 5B:
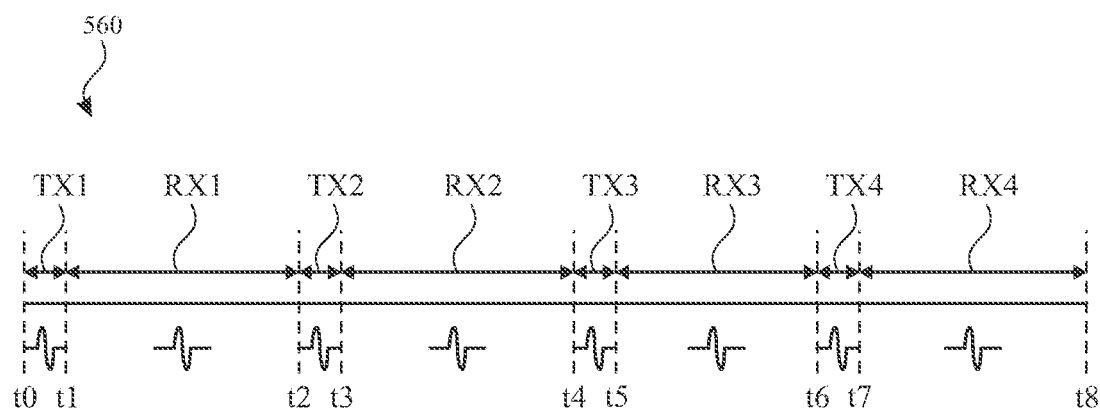

FIG. 5B illustrates an exemplary timing diagram 560 for an acoustic touch sensing scan described in FIG. 5A according to examples of the disclosure. As illustrated in FIG. 5B, each of the transducers can transmit acoustic waves and then receive reflected waves in a series of measurement steps. For example, from t0 to t1 a first transducer (e.g., acoustic transducer 502A) can be stimulated, and reflections at the first transducer can be received from t1 to t2. From t2 to t3 a second transducer (e.g., acoustic transducer 502B) can be stimulated, and reflections at the second transducer can be received from t3 to t4. From t4 to t5 a third transducer (e.g., acoustic transducer 502C) can be stimulated, and reflections at the third transducer can be received from t5 to t6. From t6 to t7 a fourth transducer (e.g., acoustic transducer 502D) can be stimulated, and reflections at the fourth transducer can be received from t7 to t8. Although the transmit (Tx) and receive (Rx) functions are shown back-to-back in FIG. 5B for each transducer, in some examples, gaps can be included between Tx and Rx functions for a transducer (e.g., to minimize capturing portions of the transmitted wave at the receiver), and or between the Tx/Rx functions of two different transducers (such that acoustic energy and the transients caused by multiple reflections from a scan by one transducer does not impact a scan by a second transducer). In some examples, unused transducers can be grounded (e.g., by multiplexers/demultiplexers).

Figure 5C:
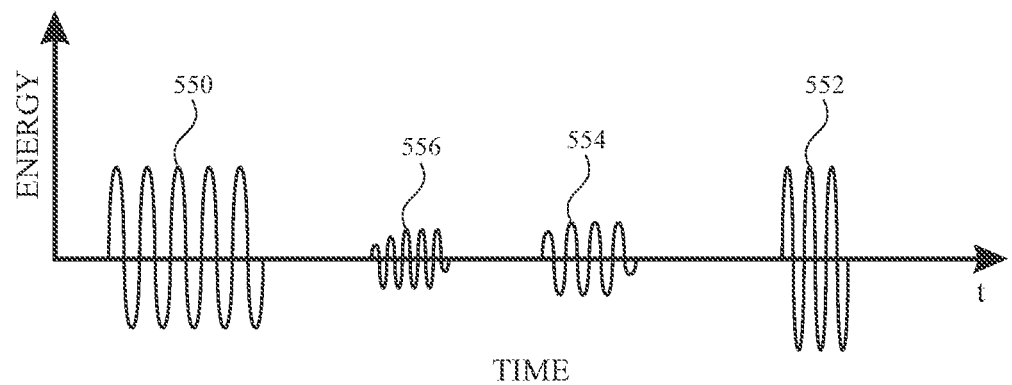

The distance between an object touching the surface and a transducer can be calculated based on TOF principles. The acoustic energy received by transducers can be used to determine a timing parameter indicative of a leading edge of a touch. The propagation rate of the acoustic wave through the material forming the surface (and the polarizer) can be a known relationship between distance and time. Taken together, the known relationship between distance and time and the timing parameter can be used to determine distance. FIG. 5C illustrates an exemplary timing diagram according to examples of the disclosure. FIG. 5C illustrates the transducer energy output versus time. Signal 550 can correspond to the acoustic energy at the transducer from the generation of the acoustic wave at a first edge of the surface. Signal 552 can correspond to the acoustic energy at the transducer received from the wave reflected off of a second edge opposite the first edge of the surface. Due to the known distance across the surface from the first edge to the opposite the second edge and the known or measured propagation rate of the acoustic signal, the reflection off of the opposite edge of the surface occurs at a known time. Additionally, one or more objects (e.g., fingers) touching the surface can cause reflections of energy in the time between the generation of the wave and the edge reflection (i.e., between signals 550 and 552). For example, signals 556 and 554 can correspond to reflections of two objects touching the surface (or a leading and trailing edge of one object). It should be understood that signals 550-556 are exemplary and the actual shape of the energy received can be different in practice.

In some examples, the timing parameter can be a moment in time that can be derived from the reflected energy. For example, the time can refer to that time at which a threshold amplitude of a packet of the reflected energy is detected. In some examples, rather than a threshold amplitude, a threshold energy of the packet of reflected energy can be detected, and the time can refer to that time at which a threshold energy of the packet is detected. The threshold amplitude or threshold energy can indicate the leading edge of the object in contact with the surface. In some examples, the timing parameter can be a time range rather than a point in time. To improve the resolution of a TOF-based sensing scheme, the frequency of the ultrasonic wave and sampling rate of the receivers can be increased (e.g., so that receipt of the reflected wave can be localized to a narrower peak that can be more accurately correlated with a moment in time).

In some examples, transducers 502A-D can operate in a time multiplexed manner, such that each transducer transmits and receives an acoustic wave at a different time during a measurement cycle so that the waves from one transducer do not interfere with waves from another transducer. In other examples, the transducers can operate in parallel or partially in parallel in time. The signals from the respective transducers can then be distinguished based on different characteristics of the signals (e.g., different frequencies, phases and/or amplitudes).

Figure 5D:
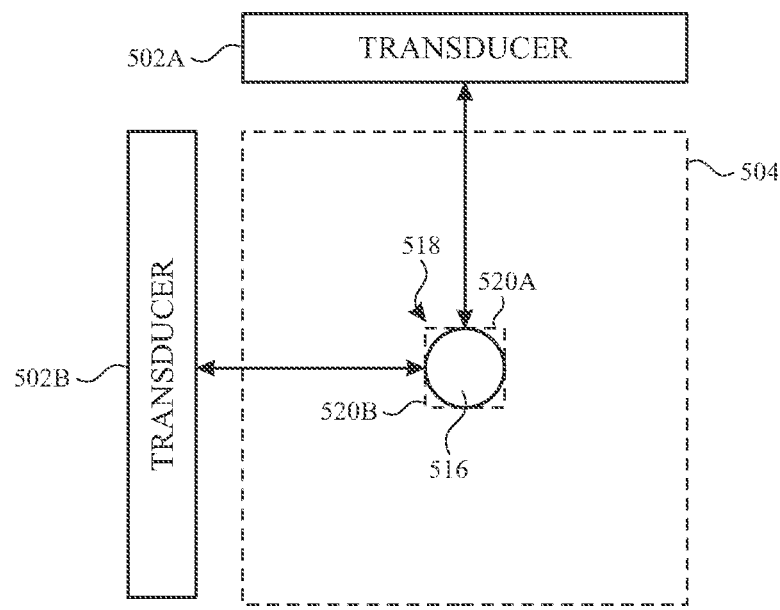

Although four transducers are illustrated in FIG. 5A, in some examples, fewer transducers can be used. For example, when using an input object with known dimensions, as few as two transducers can be used. FIG. 5D illustrates an exemplary acoustic touch sensing system configuration using two acoustic transducers 502A and 50B mounted along two perpendicular edges (e.g., one horizontal edge and one vertical edge) of a surface 500 (surface 500 is omitted for clarity of illustration). An object in contact within the active region 504 of the surface (represented by touch 516) can be an object with known dimensions. For example, a stylus tip can have a known size and shape (e.g., a diameter of 1-2 mm). As described above with respect to FIG. 5A, a first distance illustrated by boundary line 520A can be measured by the TOF of an acoustic wave transmitted and received by transducer 502A, and a second distance illustrated by boundary line 520B can be measured by the TOF of an acoustic wave transmitted and received by transducer 502B. Based on the known dimensions of object, bounding box 518 can be formed (e.g., by adding the diameter of object to the first and second distances). Based on the bounding box, the acoustic touch sensing system can determine position of touch 516 (e.g., based on a centroid). In some examples, the position can be determined based on the two measured distances without requiring forming the bounding box (e.g., the position estimating algorithm can use the dimensions of the object and the two measured distances to calculate the centroid).

In some examples, a user's finger(s) can be characterized such that a two transducer scheme can be used to detect touches by one or more fingers. In some examples, user input can be primarily from an index finger. The user's index finger can be characterized (e.g., dimensions or size) and the bounding box scheme can be applied using two TOF measurements and the finger characteristics. In some examples, multiple fingers can be characterized. During operation, the finger(s) can be identified and then the characteristics of the identified finger(s) can be used with two TOF measurements to determine position.

Figure 5E:
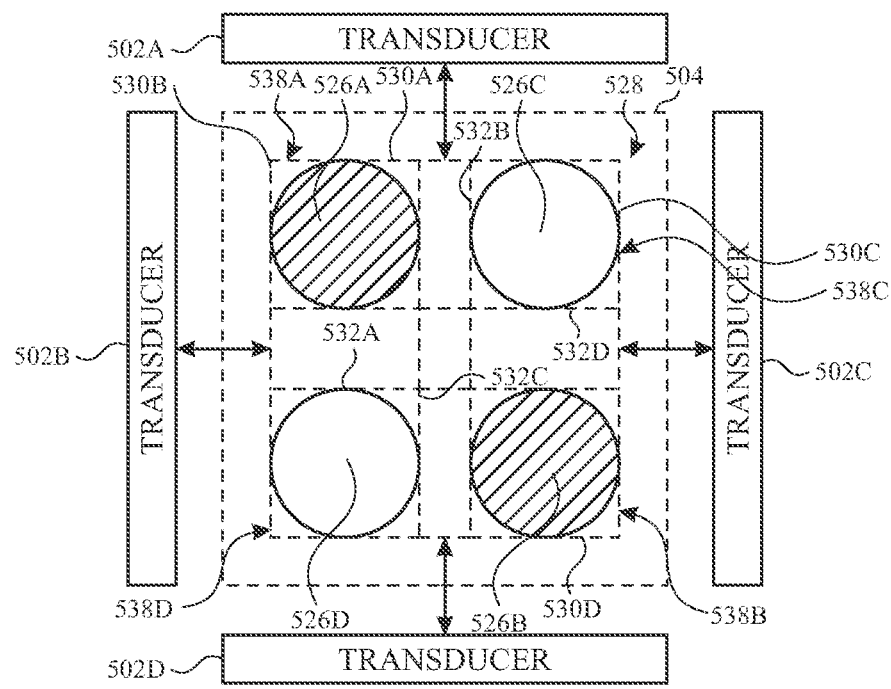

FIGS. 5A and 5D illustrate detection of a single object. In some examples, however, the acoustic touch sensing system can be configured to detect multiple touches. FIG. 5E illustrates an exemplary acoustic touch sensing system configuration configured to detect multiple touches. The acoustic touch sensing system can include four acoustic transducers 502A-502D and an active area 504 as described above with respect to FIG. 5A. Instead of one object touching within active area 504, in FIG. 5E two objects can be touching within the active area 504. The two objects, however, can create an ambiguity in the acoustic touch sensing system regarding the positions of the two objects. The two objects can correspond to either touches 526A and 526B or to touches 526C and 526D. Two of the touches can be actual touches and the other two of the touches can be phantom touches.

For example, TOF measurements can be performed by using transducers 502A, 502B, 502C and 502D to determine a distance to the two objects. For example, transducer 502A can receive two packets of reflected acoustic energy corresponding to the two objects (e.g., as illustrated in FIG. 5C, for example). A first TOF distance to the edge of either touch 526A or touch 526C can be marked by boundary line 530A, and a second TOF distance to the edge of either touch 526B or touch 526D can be marked by boundary line 532A. Likewise, transducer 502B can be used to determine a boundary line 530B corresponding to touch 526A or touch 526D, and a boundary line 532B corresponding to touch 526B or touch 526C. Transducer 502C can be used to determine a boundary line 530C corresponding to touch 526B or touch 526C, and a boundary line 532C corresponding to touch 526A or touch 526D. Transducer 502D can be used to determine a boundary line 530D corresponding to touch 526B or touch 526D, and a boundary line 532D corresponding to touch 526A or touch 526C. Taken together, boundary lines 530A-D and 532A-D can form bounding boxes 538A-D. For example, bounding box 538A can be formed from boundary lines 530A, 530B, 532C and 532D. Similarly, bounding box 538D can be formed from boundary lines 532A, 530B, 532C and 530D.

In some examples, the two actual touches can be disambiguated when they are sequential. The first touch can be registered and then the second sequential touch can be disambiguated based on the first touch. For example, in the example illustrated in FIG. 5E, if touch 526A is detected first, then in the subsequent measurement cycle the two touches can be determined to be touches 526A and 526B. In contrast, if touch 526C is detected first, then in the subsequent measurement cycle the two touches can be determined to be touches 526C and 526D. As long as the touches remain far enough apart to be resolved into separate bounding boxes (and assuming the touch contact moves only small amounts between each measurement interval), the two touches can be tracked. In practice, the apparently simultaneous multi-touch by a user can be viewed as sequential touches if the acquisition time (measurement cycle) of the acoustic sensors is short enough to register the sequence. Thus, if the measurement cycle repeats frequently enough, the acoustic touch sensing system can disambiguate the multiple touches with four transducers.

In some examples, e.g., when multiple touches cannot be resolved, bounding box 528 can be used to determine the position of touch. Bounding box 528 can be formed from boundary lines 530A-D.

Figure 5F:
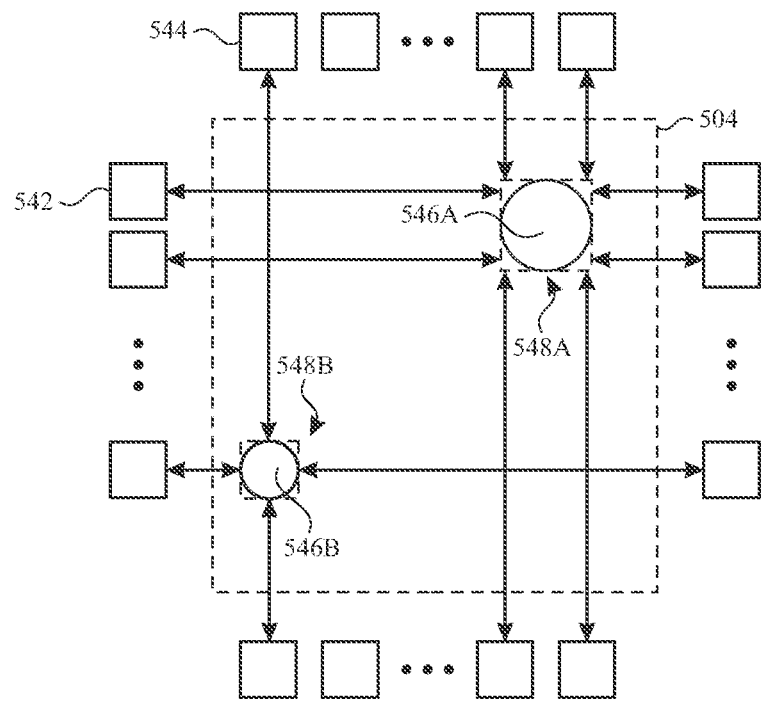

The multi-touch capabilities described with reference to FIG. 5E can be limited based on the disambiguation requirements (e.g., sequential contact and tracking). In some examples, multi-touch capabilities can be provided by increasing the number of transducers in the system. FIG. 5F illustrates an exemplary acoustic touch sensing system configuration configured to detect multiple touches. The acoustic touch sensing system in FIG. 5F can include one or more transducers 542 and 544 arranged along edges of the surface and forming active area 504. Each of the transducers 542 and 544 can transmit acoustic waves and measure the reflections to determine the presence and location of one or more objects. For example, as illustrated, bounding box 548A can be formed around touch 546A based on TOF measurements from eights transmitters, and bounding box 548B can formed around touch 546B based on TOF measurements from four of the transmitters. Multiple transducers can also be implemented in place of the two transducers illustrated in FIG. 5D.

In some examples, the arrangement of multiple transducers illustrated in FIG. 5F can be implemented without the multi-touch capability described with respect to FIG. 5F. Instead, the multiple transducers on each of the sides can be coupled together and can act as a single transducer on each of the four sides as described with reference to FIGS. 5A and 5E (or on two sides as described with reference to FIG. 5D).

TOF schemes described with reference to FIGS. 5A-5F can provide for touch sensing capability using a limited number of transducers, which can simplify the transmitting and receiving electronics (e.g., as compared with capacitive touch sensing, which may require a larger number of channels), and can reduce time and memory requirements for processing. Although FIGS. 5A-5F discuss using a bounding box based on TOF measurements to determine position of an object, in other examples, different methods can be used, including applying matched filtering to a known transmitted ultrasonic pulse shape, and using a center of mass calculation on the filtered output (e.g., instead of a centroid).

As described herein, a polarizer (e.g., polarizer 220, 256) can be disposed between a transducer and a surface in which the acoustic waves propagate. For a water-agnostic acoustic touch sensing system, the transducer can be shear-polarized to generate primarily shear horizontal waves with displacement within the surface parallel to the top and bottom of the surface (e.g., in-plane displacement). The polarizer can be designed to filter out other non-shear modes (e.g., compressional waves, Lamb waves, etc.), that may be generated due to discontinuous boundary conditions between the transducer and surface, and that may interact with water due to out-of-plane displacement. The polarizer can selectively absorb or reflect back a wave with specific displacement field direction while it is transparent to other type of waves having different displacement field direction. In some examples, the polarizer can be an electro-elastic piezoelectric polarizer with one or more layers of piezoelectric material. In some examples, the polarizer can be a magneto-elastic polarizer. In some examples, the polarizer can be a mechanical polarizer with multiple layers. Although each of the above polarizers is described herein separately, in some examples, an ultrasonic polarizer can be formed from combinations of elastic piezoelectric, magneto-elastic, and/or mechanical polarizer layers.

Mechanical Polarizer

In some examples, the polarizer can be a mechanical polarizer with multiple layers. Due to the differences between shear velocity (transverse velocity) and compressional velocity (longitudinal velocity) between materials, the frequency bandwidth shift in passband frequency of a multi-layer structure can be created between compressional and shear waves. For example, for a material such as steel or aluminum with a Poisson ratio of approximately 0.3, the resonant frequency for compressional waves can be approximately 1.6 times larger than the resonant frequency for shear waves. The resonant frequency for a polarizer layer can be calculated approximate by the expression $$f_{resonance} = \frac{v}{2 \cdot t},$$

where $f_{resonance}$ can represent the resonant frequency of the layer, v can represent the wave velocity (e.g., shear or compressional), and t can represent the thickness of the layer. At or near the resonance frequency of the layer for compressional waves, the polarizer can attenuate compressional waves, and thus this resonance frequency can be a starting point for selecting and designing some or all layers of the polarizer. The multi-layer polarizer, however, may not share the resonance of individual layers. For these multi-layer stacks, the resonant frequency of each layer can depend on the material properties of that layer and its neighboring layer(s). Thus, for a multi-layer polarizer, the passband (or stopband) characteristics can be designed or derived using finite element analysis (FEA) stimulation or equations. Adjusting the material and thickness of each layer in the multi-layer polarizer, can provide for efficiently passing acoustic waves in some frequency bands and stopping (e.g., attenuating or damping) acoustic waves in other frequency bands.

Figure 6A:
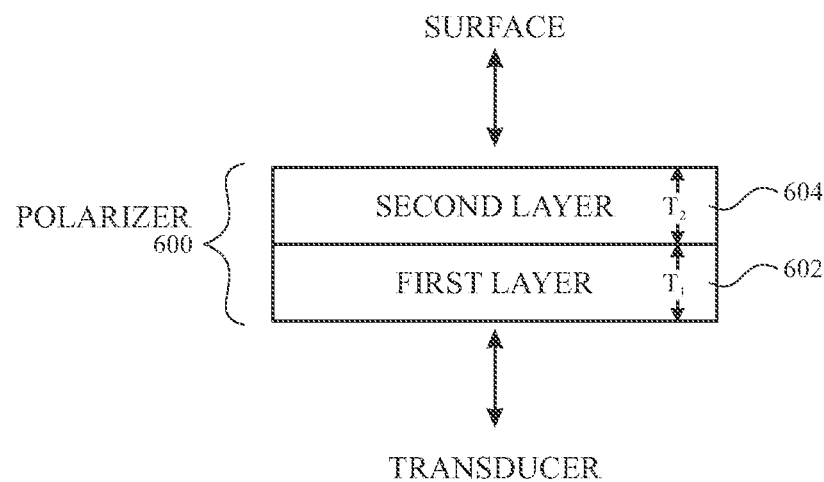
FIG. 6A illustrates an exemplary stack-up of an exemplary multi-layer polarizer including two layers according to examples of the disclosure.

In some examples, a mechanical polarizer can be formed from two layers having different acoustic characteristics. FIG. 6A illustrates an exemplary stack-up of an exemplary multi-layer polarizer including two layers according to examples of the disclosure. Multi-layer polarizer 600 can include a first layer 602 and a second layer 604. The first layer 602 can be coupled to a transducer (e.g., transducer 204, 254) and the second layer 604 can be coupled to a surface (e.g., surface 252). In some examples, the first layer can be formed from a material with a relatively low impedance characteristic and the second layer can be formed from a material with a relatively high impedance characteristic. For example, the first layer can be formed from a soft material such as silicone, epoxy or pressure sensitive adhesive, etc. and the second layer can be formed of a hard material such as steel, silicon, glass, aluminum, tungsten, alloys etc. As used herein, reference to a material as hard (stiff) or soft can refer to a materials Young's modulus or Shear modulus. The larger the Young's modulus and/or shear modulus (and these parameters often scale together) the harder a material can be and the smaller the Young's modulus and/or shear modulus the softer a material can be. As used herein materials with a Young's modulus greater than or equal to 20 GPa can be considered hard or stiff and materials with a Young's modulus less than 5 GPa can be considered soft. The first layer 602 can have a thickness, $T_1$, in the z-direction and the second layer 604 can have a thickness, $T_2$, in the z-direction, where $T_2<T_1$. In some examples, $T_1$ can be between 100 µm and 250 µm (e.g., 130 µm) and $T_2$ can be between 25 µm and 100 µm (e.g., 70 µm). The dimensions of the polarizer in the x-y plane can be the same as (or within a threshold tolerance of) the dimensions of the transducer on which it is disposed. The stiffness (i.e., a characteristic of the type of material) and thickness of each layer can be selected to ensure separation of the passbands for compressional waves and for shear waves.

Figure 6B:
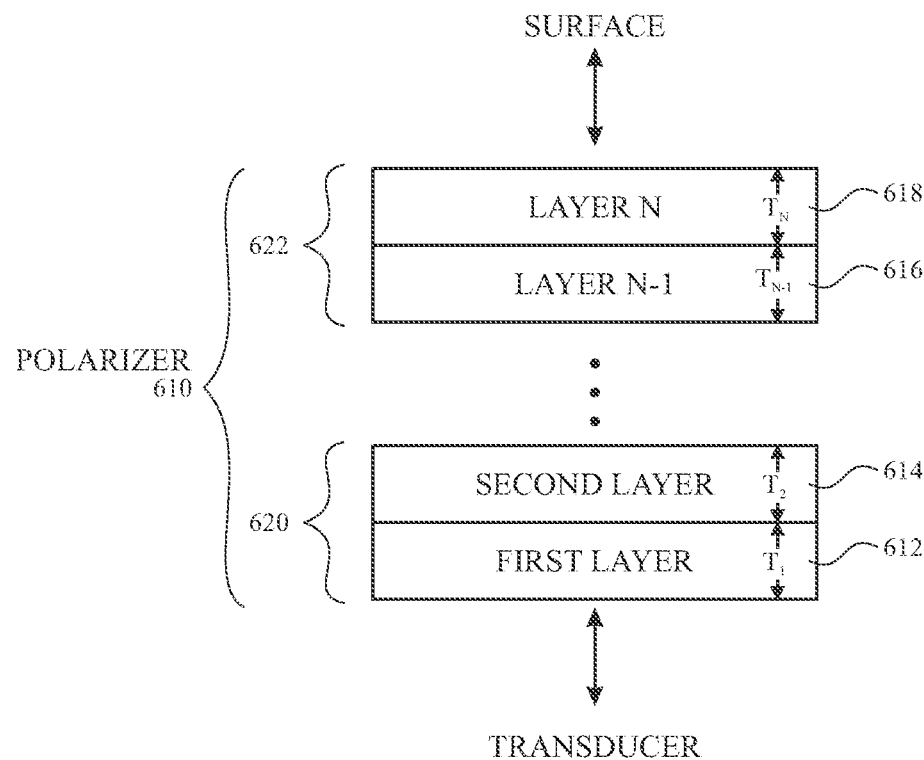
FIG. 6B illustrates an exemplary stack-up of an exemplary multi-layer polarizer including more than two layers according to examples of the disclosure.

In some examples, a mechanical polarizer can be formed from more than two layers. For example, a polarizer can be formed from multiple polarizer cells, each cell including two layers. FIG. 6B illustrates an exemplary stack-up of an exemplary multi-layer polarizer including more than two layers according to examples of the disclosure. Multi-layer polarizer 610 can include multiple polarizer cells 620, 622 disposed on top of one another. Polarizer cell 620, for example, can include a first layer 612 and a second layer 614. The first layer 612 of polarizer cell 620 can be coupled to a transducer (e.g., transducer 204, 254). Polarizer cell 622, for example, can include layer N-1 616 and layer N 618. Layer N 618 can be coupled to a surface (e.g., surface 252). Each polarizer cell 620, 622 can include one layer formed from a material with a relatively low impedance characteristic (e.g., epoxy) and one layer formed from a material with a relatively high impedance characteristic (e.g., metal). Each layer can have a thickness, $T_1$-$T_N$, in the z direction. The x-y dimensions of each layer of the transducer can be the same as (or within a threshold tolerance of) the transducer on which the polarizer is disposed.

Figure 7A:
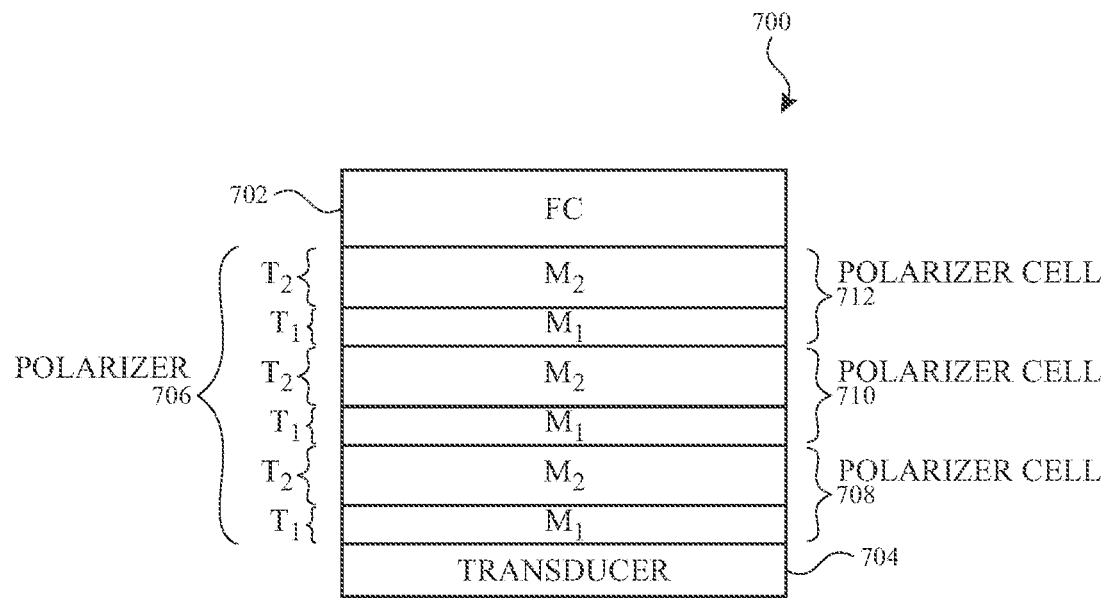
FIGS. 7A-7D illustrate exemplary stack-ups including a surface, a transducer and a multi-layer polarizer according to examples of the disclosure.

In some examples, each polarizer cell 620, 622 can use the same materials and corresponding thicknesses. For example, the multi-layer polarizer 610 can be constructed by alternating layers of a low-impedance material of a first thickness and a high-impedance material of a second thickness. In such a polarizer, the odd layers can be made of the same first material having the same first thickness and the even layers can be made of the same second material having the same second thickness. FIG. 7A illustrates an exemplary stack-up 700 including surface 702, transducer 704 and multi-layer polarizer 706 according to examples of the disclosure. Polarizer 706 can be disposed between surface 702 (e.g., front crystal) and transducer 704. Polarizer 706 can include three polarizer cells 708, 710 and 712, with each polarizer cell including a first layer of a first material M1 of a first thickness T1 and a second layer of a second material M2 of a second thickness T2. M1 can be a soft, low-acoustic-impedance material and M2 can be a hard, high-impedance material. Thicknesses T1 and T2 can be different thicknesses. In some examples, polarizer 706 can include alternating layers of the first material M1 and second material M2 (e.g., each of polarizer cells 708, 710 and 712 use M1 and M2), but the thicknesses of one or both layers M1 and M2 may be different between polarizer cells.

Figure 7B:
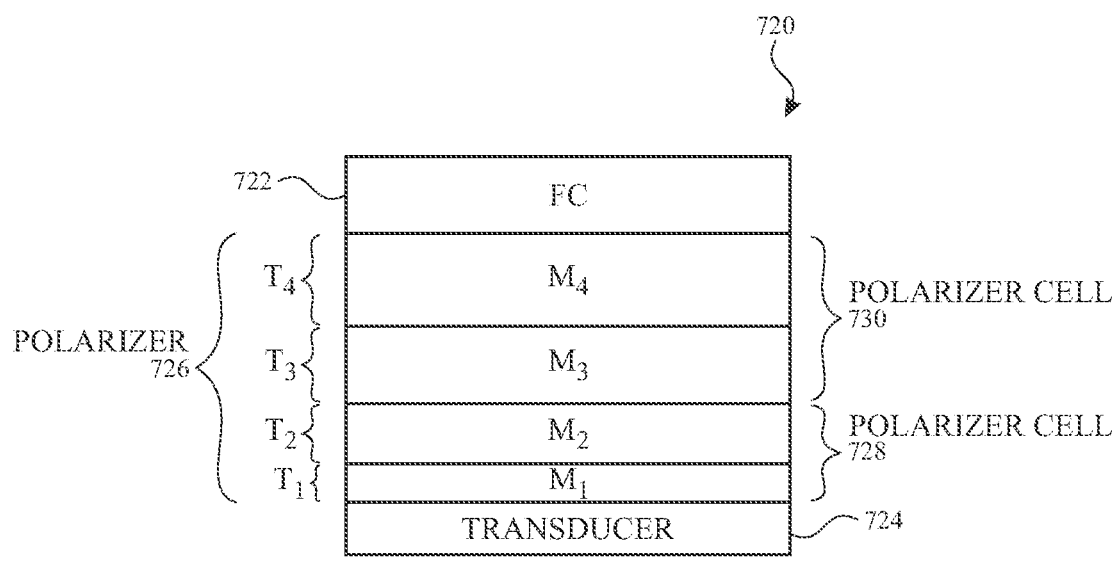

In some examples, polarizer cells 620, 622 can use different materials and/or corresponding thicknesses. For example, the multi-layer polarizer 610 can be constructed by alternating layers of different low-impedance materials and different high-impedance materials, and each of the layers can be a different thickness as well. FIG. 7B illustrates an exemplary stack-up 720 including surface 722, transducer 724 and multi-layer polarizer 726 according to examples of the disclosure. Polarizer 726 can be disposed between surface 722 (e.g., front crystal) and transducer 724. Polarizer 726 can include two polarizer cells 728 and 730, with a first polarizer cell 728 including a first layer of a first material M1 of a first thickness T1 and a second layer of a second material M2 of a second thickness T2, and with a second polarizer cell 730 including a third layer of a third material M3 of a third thickness T3 and a fourth layer of a fourth material M4 of a fourth thickness T4. M1 and M3 can be different soft, low-acoustic-impedance materials (e.g., epoxy, silicone, etc.) and M2 and M4 can be different hard, high-impedance materials (aluminum, steel, etc.). Thicknesses T1, T2, T3 and T4 can be different thicknesses.

Figure 7C:
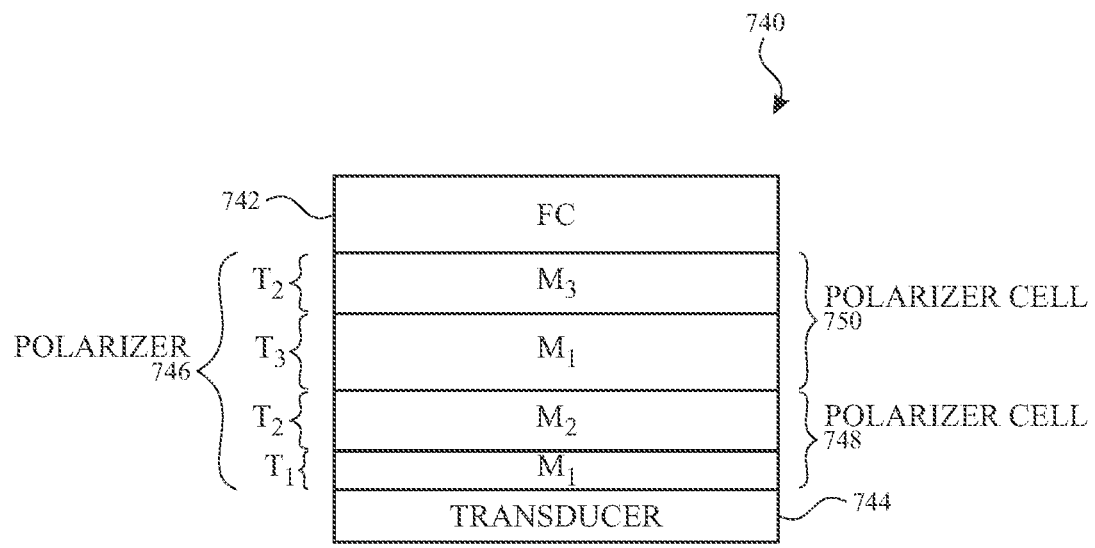

In some examples, some materials may be the same and some materials may be different between polarizer cells and some of the thicknesses may be the same and some of the thicknesses may be different between polarizer cells. FIG. 7C illustrates an exemplary stack-up 740 including surface 742, transducer 744 and multi-layer polarizer 746 according to examples of the disclosure. Polarizer 746 can be disposed between surface 742 (e.g., front crystal) and transducer 744. Polarizer 746 can include two polarizer cells 748 and 750, with a first polarizer cell 748 including a first layer of a first material M1 of a first thickness T1 and a second layer of a second material M2 of a second thickness T2, and with a second polarizer cell 750 including a third layer of the first material M1 of a third thickness T3 and a fourth layer of a third material M3 of the second thickness T2. M1 can be the same soft, low-acoustic-impedance material and M2 and M3 can be different hard, high-impedance materials. Thicknesses T1, T2 and T3 can be different thicknesses.

Figure 7D:
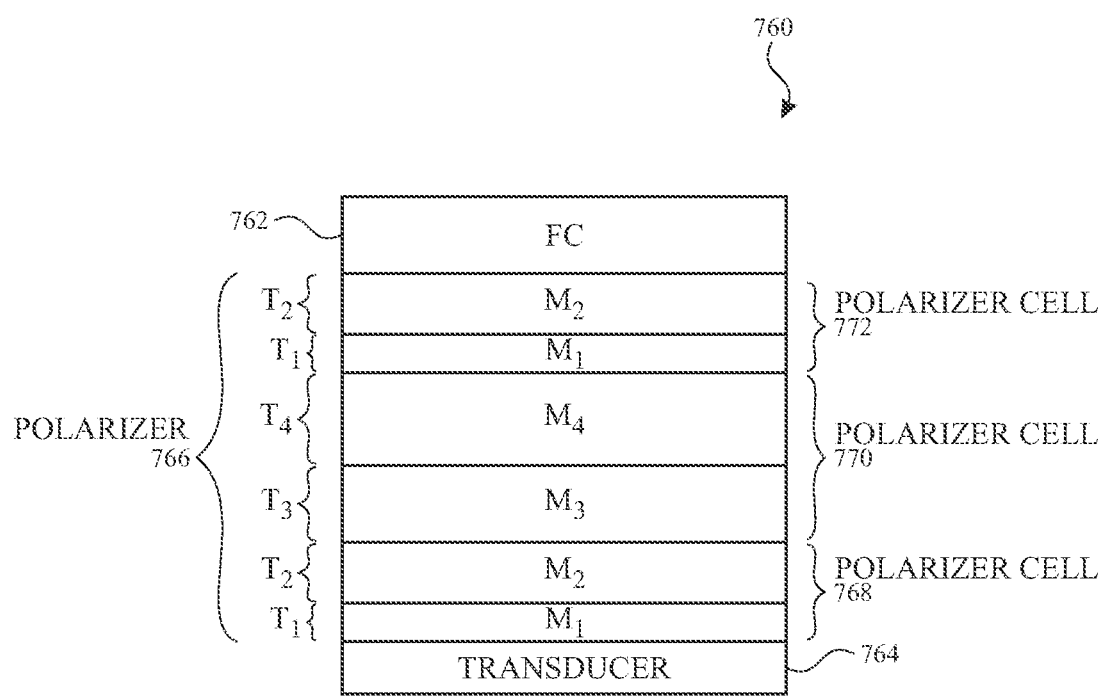

In some examples, a polarizer may include a plurality of polarizer cells and some of the polarizer cells may be the same (same materials and thicknesses) and other polarizer cells may be different (different material(s) and thickness(es)). FIG. 7D illustrates an exemplary stack-up 760 including surface 762, transducer 764 and multi-layer polarizer 766 according to examples of the disclosure. Polarizer 766 can be disposed between surface 762 (e.g., front crystal) and transducer 764. Polarizer 766 can include three polarizer cells 768, 770 and 772. A first polarizer cell 768 and a third polarizer cell 772 can each include a first layer of a first material M1 of a first thickness T1 and a second layer of a second material M2 of a second thickness T2. A second polarizer cell 770 can include a third layer of a third material M3 of a third thickness T3 and a fourth layer of a fourth material M4 of a fourth thickness T4. M1 and M3 can be different soft, low-acoustic-impedance materials and M2 and M4 can be different hard, high-impedance materials. Thicknesses T1, T2, T3 and T4 can be different thicknesses.

Multi-layer polarizers (e.g., polarizers 600, 610, 706, 726, 746, 766) can provide wideband efficiency (e.g., on the order of a 100 kHz bandwidth or MHz bandwidth). For example, a bandwidth of a polarizer for use with a shear-polarized transducer polarizer can be defined by a range of frequencies for which the transmission efficiency for shear waves (or another wave of interest) is above a first threshold and the transmission efficiency for compressional waves (or another parasitic wave to the wave of interest) is below a second threshold. In some examples, the first threshold can be a transmission efficiency of 90% for shear waves and the second threshold can be a transmission efficiency of 10% for compressional waves. It should be understood that these thresholds are exemplary and addition thresholds are possible (e.g., first threshold of 60%, 70%, 80%, 90%; second threshold of 15%, 10%, 5%, 1%). Additionally, multi-layer polarizers described herein can be manufactured using conventional techniques and still provide for a passband with a high-frequency center frequency (e.g., greater than 500 kHz, greater than 1 MHz, greater than 5 MHz).

Figure 8A:
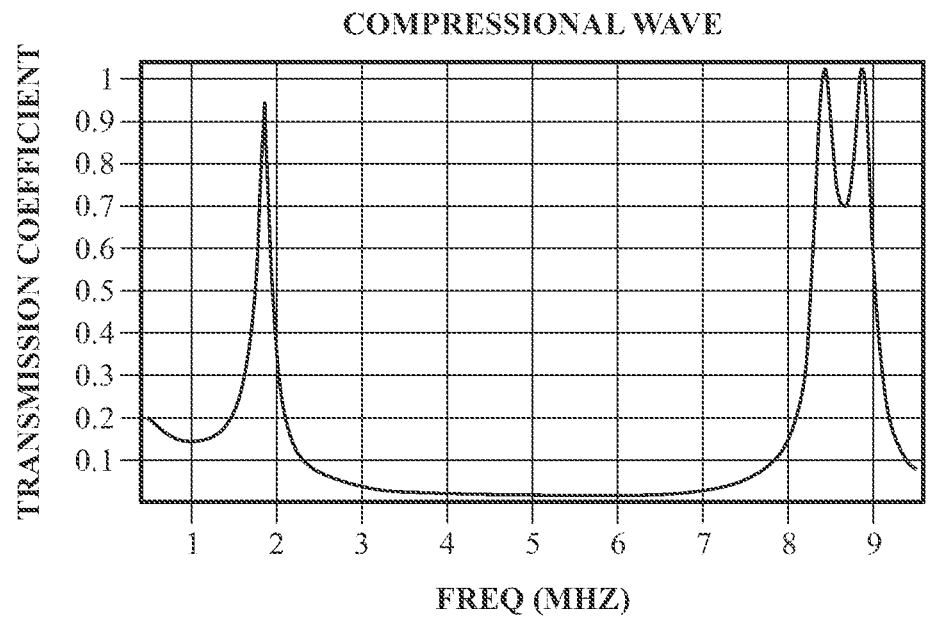
FIGS. 8A-8B illustrate exemplary plots of frequency dependent transmission coefficients through an exemplary polarizer for compressional and shear waves according to examples of the disclosure.
Figure 8B:
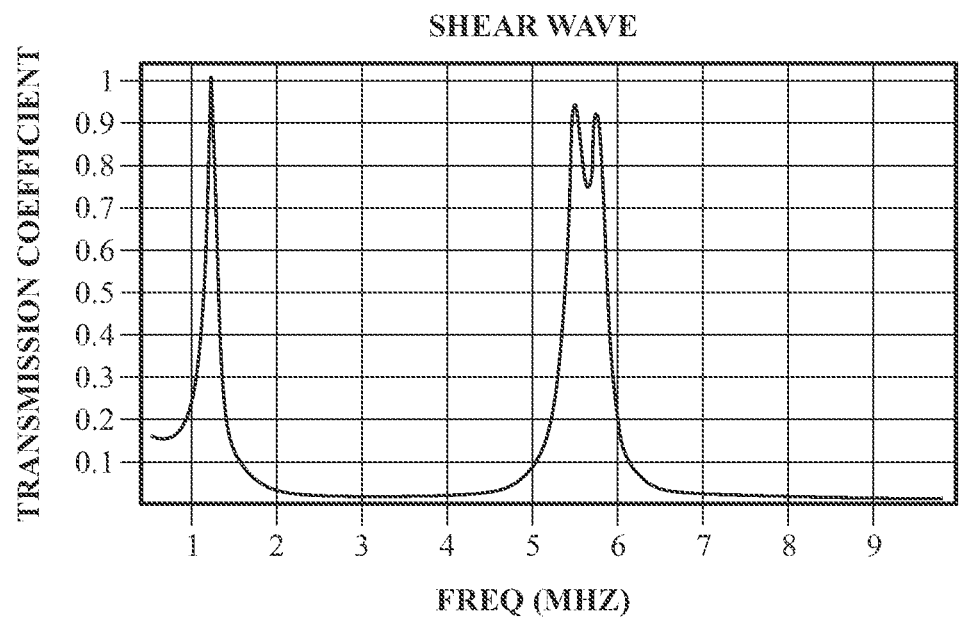

FIGS. 8A-8B illustrate exemplary plots of frequency dependent transmission coefficients through an exemplary polarizer for compressional and shear waves according to examples of the disclosure. FIG. 8A, for example, shows a passband of an exemplary polarizer with transmission coefficients greater than 70% in a frequency range between 8 and 9 MHz and a stop band with transmission coefficients less than 10% between 3 MHz and 7 MHz for compressional waves. FIG. 8B, for example, shows a passband of an exemplary polarizer with transmission coefficients greater than 65% in a frequency range between 5 MHz and 6 MHz and a stop band with transmission coefficients less than 10% between 2 MHz and 4 MHz and between 6 MHz and 8 MHz for shear waves. Operating an acoustic touch sensing system between 5 MHz and 6 MHz can allow the polarizer to pass shear waves and reject compressional waves.

FIGS. 8A-8B illustrate filter characteristics for one exemplary polarizer. The specific filter characteristics of the multi-layer polarizer can be optimized for an application by adjusting the material properties, thickness of layers and number of layers. The characteristics can include the center frequency of the passband for compressional and shear waves (which can be a function of the Young's modulus and/or shear modulus of the selected materials and thickness of the layers), the filter quality and the fractional bandwidth. For example, adding additional layers to the polarizer can be equivalent to increasing the order of a traditional filter, which generally improves the quality of the filter. A higher order filter can have a wider broadband response and a higher stopband attenuation for compressional waves. As a result, adding more layers may prevent the dual peaks in the high-frequency passbands for compressional and shear waves and widen the bandwidth of the passbands (as compared with FIGS. 8A and 8B), but the additional layers may tradeoff the peak transmission coefficient (which may be reduced in the passband) and the overall thickness to the polarizer (which may be limited by the space available in the application and the manufacturability of thin layers). Additionally, a higher impedance mismatch between layers (resulting from an optimization of the types of materials selected and their selected thicknesses) can improve filter selectivity. However, the choice of materials and thickness may be limited by manufacturability, reliability and cost.

Additionally, the selection of the material properties, thickness of layers and number of layers can be selected to ensure proper separation between the compressional and shear wave passbands. In some examples, for example as illustrated in FIGS. 8A-8B, the passbands for both shear and compressional waves can be well-separated such that the transmission coefficient can be less than a threshold (e.g., 5%, 1%) for a threshold frequency range (e.g., 10 kHz, 100 kHz, 1 MHz) between the shear passband and the compressional passband. In some examples, the filter performance may be sufficient even if the passbands for shear and compressional waves can partially overlap so long as there is sufficient frequency bandwidth in which the shear waves can be passed (above a threshold transmission coefficient, e.g., 50%, 60%) and the compressional waves can be stopped (below a threshold transmission coefficient, e.g., 20%, 10%, 5%).

The multi-layer polarizer of FIGS. 6A-6B and 7A-7D corresponds to a one-dimensional filter structure which provides significant filter quality for plane waves having a propagation direction perpendicular to the plane of the polarizer. However, the filter quality can degrades for waves that are transmitted to the surface or reflect back from the surface with a different angle. The angular dependence of the polarizer can be overcome, in some examples, by using a multi-dimensional (e.g., two-dimensional) polarizer structure. The two-dimensional filter structure can be designed using photonic or phononic crystals having two-dimensional periodicity to provide the requisite filter quality with less or no angular dependence.

Figure 9A:
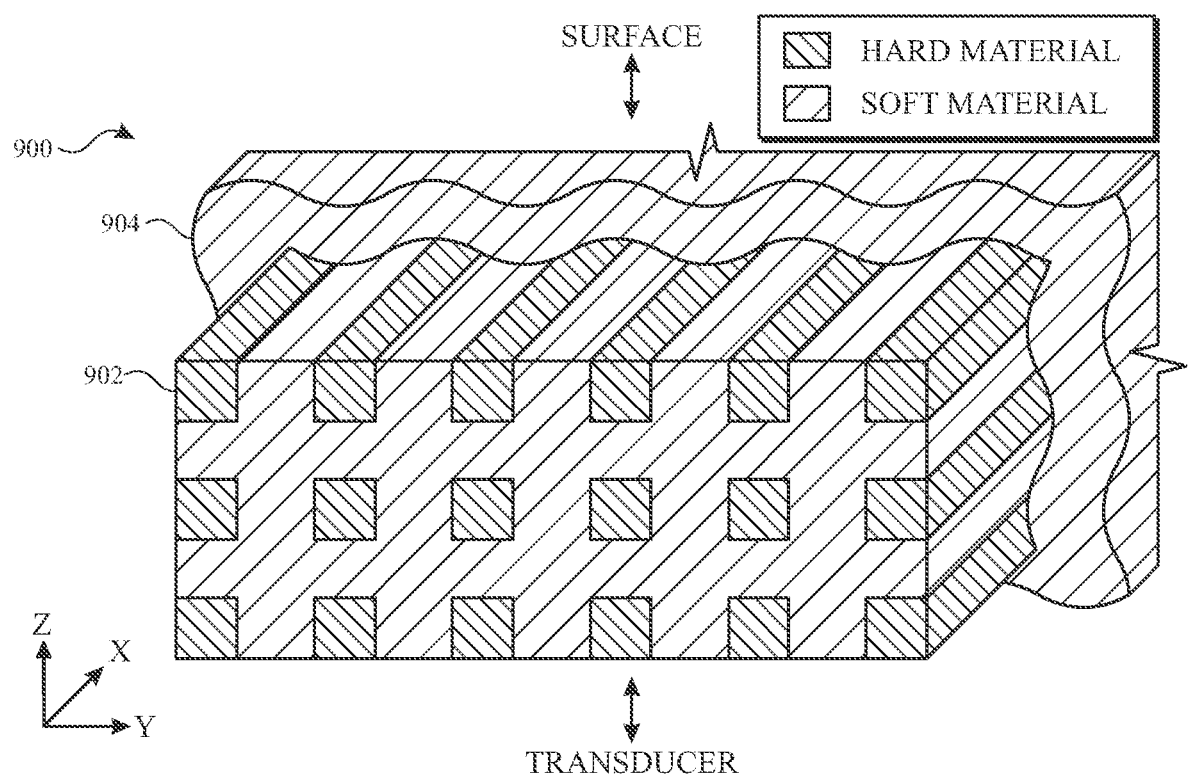
FIGS. 9A-9B illustrate exemplary multi-dimensional polarizer structures according to examples of the disclosure.
Figure 9B:
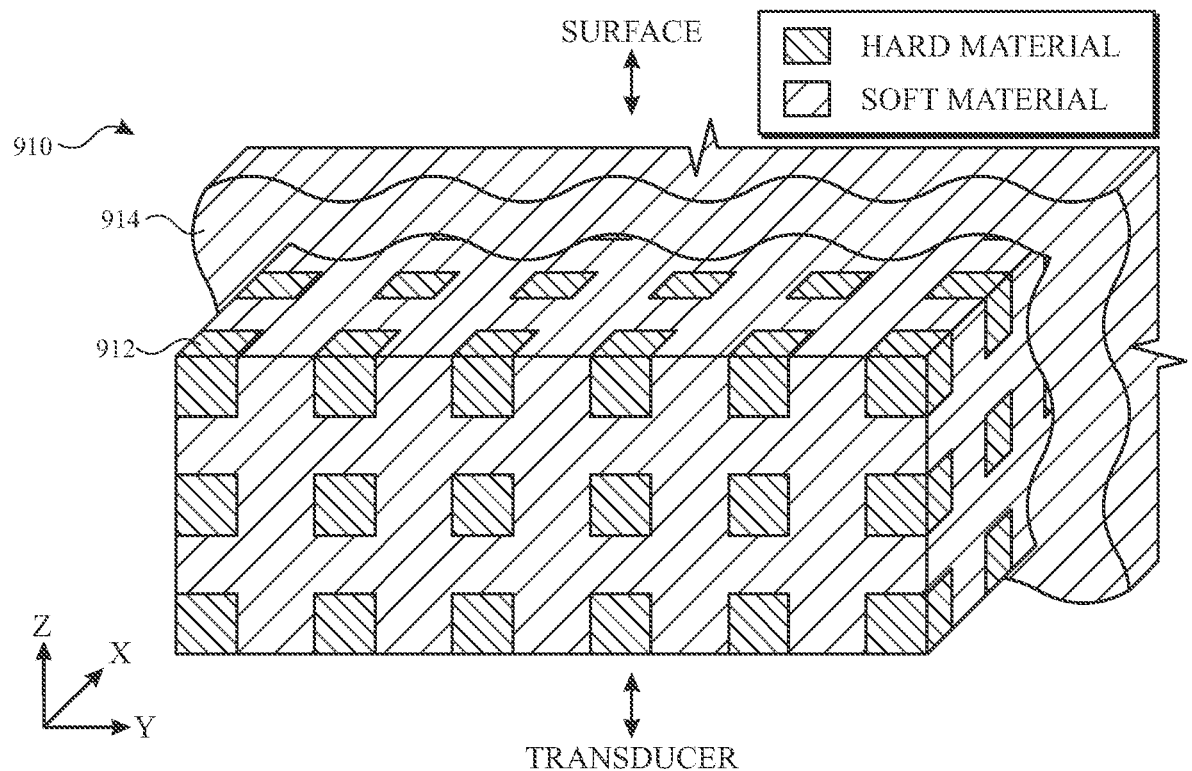

FIGS. 9A-9B illustrate exemplary multi-dimensional polarizer structures according to examples of the disclosure. Polarizer 900 of FIG. 9A or polarizer 910 of FIG. 9B can be disposed between a surface and a transducer. Unlike a one-dimensional polarizer structure (e.g., illustrated in FIG. 6A), the two-dimensional structure of polarizer 900 can, for example, include strips of a hard material 902 (e.g., metal, glass, silicon, etc.) embedded in a soft material 904 (e.g., epoxy, PSA, rubber, etc.). For purposes of illustration, the outer layer of soft material 904 forming polarizer 900 is shown peeled away in the foreground to shown the hard material embedded therein. The strips of hard material 902 can be separated from one another in the y-direction and z-direction of the axes illustrated in FIG. 9A. In some examples, rather than strips of hard material, polarizer 910 can include cubes of hard material 912 embedded in the soft material 914. For purposes of illustration, the outer layer of soft material 914 forming polarizer 910 is shown peeled away in the foreground to shown the hard material embedded therein. The cubes of hard material 912 can be separated from one another in the x-direction, y-direction and z-direction by the soft material. Although described and illustrated as strips and evenly spaced hard materials having rectangular or square shapes, it should be understood that other shapes and patterns can be used for multi-dimensional polarizers. The proportions and geometry of these patterns could be approximated by hand calculations and verified by simulation, for example, to ensure the correct filter characteristic for the multi-dimensional polarizer. Additionally, the filter characteristics for multi-dimensional filters can dependent on the type materials selected.

Electro-elastic Piezoelectric Polarizer

In some examples, the polarizer can be an electro-elastic piezoelectric polarizer with one or more layers of piezoelectric material. One or more circuits coupled to the one or more layers of piezoelectric material can attenuate or damp compressional acoustic waves by dissipating the electrical energy extracted by the respective layer of piezoelectric material.

In some examples, a polarizer can be formed from a layer of piezoelectric material and a corresponding electric circuit. FIG. 10A illustrates an exemplary stack-up of an acoustic touch sensing system including a polarizer with a layer of piezoelectric material according to examples of the disclosure. Stack-up 1000 can include a polarizer 1004 disposed between surface 1002 and transducer 1006. Transducer 1006 can be formed from a piezoelectric material (e.g., PZT, KNN, PVDF, PLLA, etc.) and can be shear-polarized (in the poling direction shown by the arrow in transducer 1006) such that transducer 1006 can generate, when stimulated, shear waves which propagate in the z-direction toward surface 1002, but whose field displacement is orthogonal to the direction of propagation (e.g., in-plane). As described herein, transducer 1006 may also generate some compressional waves whose field displacement is in the same direction as the direction of propagation (in the z-direction). Polarizer 1004 can be designed to filter out these compressional waves, which may interact with water.

Polarizer 1004 can include a layer of piezoelectric material 1010 and a corresponding electric circuit 1008. The layer of piezoelectric material 1010 can be polarized in a direction different than the polarization of transducer 1006. In some examples, the poling direction of the layer of piezoelectric material 1010 (shown by the arrow in the layer of piezoelectric material 1010) can be orthogonal to the poling direction of the shear-polarized transducer 1006. Compressional waves propagating from transducer 1006 into surface 1002 through polarizer 1004 can couple with the layer of piezoelectric material 1010 and the mechanical energy of the compressional wave can be converted to electrical energy (e.g., due to the orthogonal poling of the piezoelectric layer with respect to the mechanical vibration displacement of the compressional wave). The converted electrical energy can be transferred to electric circuit 1008 and can be dissipated (e.g., converted into heat). In some examples, the electric circuit 1008 can feed electrical energy back into the system at a different phase and can cancel out the incoming compressional wave. Shear waves propagating from transducer 1006 into surface 1002 through polarizer 1004 can pass through the layer of piezoelectric material 1010 without interacting and damping the shear waves.

Electrodes 1012 and 1014 illustrated in stack-up 1000 and can be used to couple electrical energy from the layer of piezoelectric material 1010 to electric circuit 1008 or to couple feedback energy from the electric circuit 1008 to the layer of piezoelectric material 1010. Although FIG. 10A only illustrates electrodes for polarizer 1004, it should be understood that stack-up 1000 can also include electrodes for transducer 1006 to stimulate and/or receive acoustic energy. In some examples transducer 1006 can include two electrodes on opposite sides of transducer 1006 in a similar manner that electrodes 1012 and 1014 are disposed on opposite sides of the layer of piezoelectric material 1010 of polarizer 1004. In some examples, the adjacent respective electrodes for the polarizer 1004 (e.g., electrode 1014) and transducer 1006 (not-shown) can be isolated from one another. In some examples, electrode 1014 can be a shared electrode between polarizer 1004 and transducer 1006. For example, electrode 1014 can be a ground terminal for both polarizer 1004 and transducer 1006.

FIGS. 11A and 11B illustrate exemplary electric circuits for use with an exemplary polarizer according to examples of the disclosure. The exemplary circuits 1100 and 1110 of FIGS. 11A and 11B can correspond to electric circuit 1008 of FIG. 10A, for example. In some examples, exemplary circuit 1100, including a resistor 1102, can be used. A first terminal 1104 of circuit 1100 (corresponding to terminal 1016 in FIG. 10A) can be coupled to the layer of piezoelectric material via electrode 1012. A second terminal 1106 of circuit 1100 (corresponding to terminal 1018 in FIG. 10A) can be coupled to the layer of piezoelectric material via electrode 1014. Resistor 1102 can be coupled between terminals 1104 and 1106 to dissipate electrical energy generated by compressional waves interacting with the layer of piezoelectric material. In some examples, exemplary circuit 1110, including a resistor 1112 and an inductor 1114, can be used. A first terminal 1116 of circuit 1110 (corresponding to terminal 1016 in FIG. 10A) can be coupled to the layer of piezoelectric material via electrode 1012. A second terminal 1118 of circuit 1100 (corresponding to terminal 1018 in FIG. 10A) can be coupled to the layer of piezoelectric material via electrode 1014. Resistor 1112 and inductor 1114 can be coupled in series between terminals 1116 and 1118 to dissipate electrical energy generated by compressional waves interacting with the piezoelectric material and to shift the phase of some electrical energy and feed the phase-shifted electrical energy back into the layer of piezoelectric material to dampen the incoming compressional waves. Although FIGS. 11A and 11B include resistors to convert electrical energy to heat, other components can be used to convert electrical energy to heat (e.g., inductors, capacitors, transistors, diodes, active circuits, etc.). More generally, the electric circuit (e.g., electric circuit 1008 of FIG. 10A) can have an impedance Z to dissipate electrical energy. The electric circuit can include active electric components (e.g., transistors) and/or passive electric components (e.g., resistors) coupled in series between a polarizer electrode and a ground. For example, the electric circuit can include a resistor, an inductor and a capacitor (RLC circuit) in series between a polarizer electrode and ground. Although FIG. 11B illustrates an inductor to phase shift and feedback electrical energy, in other examples, different circuitry can be used. For example, a variable voltage or current source can be used to provide phase-shifted feedback to dampen or attenuate the incoming compressional waves in the polarizer.

The efficiency of the damping of single-cell polarizer 1004 can be characterized by a mechanical-to-electrical efficiency measuring the ability to convert mechanical energy of compressional acoustic waves into electrical energy in the layer of piezoelectric material 1010 and characterized by an electrical-to-heat efficiency measuring the ability to convert electrical energy of the compressional acoustic wave into heat in electric circuit 1008. For example, a layer of PZT with a mechanical-to-electrical efficiency of 70% coupled to an electric circuit with an electrical-to-heat efficiency of 70% can attenuate compressional energy by 49%. Including an inductor can further attenuate compressional energy by canceling at least a portion of the incoming compressional wave. In some examples, a multi-layer polarizer can be used to further attenuate or dampen compressional energy.

FIG. 10B illustrates an exemplary stack-up of an acoustic touch sensing system including a polarizer with multiple layers of piezoelectric material according to examples of the disclosure. Stack-up 1020 can include a polarizer 1024 disposed between surface 1022 and transducer 1026. Transducer 1026 can be formed from a piezoelectric material (e.g., PZT, KNN, PVDF, PLLA, etc.) and can be shear-polarized such that transducer 1026 can generate, when stimulated, shear waves which propagate in the z-direction toward surface 1022, but whose field displacement is orthogonal to the direction of propagation (e.g., in-plane). As described herein, transducer 1026 may also generate some compressional waves whose field displacement is in the same direction as the direction of propagation. Polarizer 1024 can be designed to filter out these compressional waves, which may interact with water.

Polarizer 1024 can include multiple polarizer cells 1028, 1030, with each polarizer cell including a layer of piezoelectric material 1032, 1040 and a corresponding electric circuit 1034, 1042. The layer of piezoelectric material 1032, 1040 of each respective polarizer cell 1028, 1030 can be polarized in a direction different than the polarization of transducer 1026. In some examples, the poling direction of the layers of piezoelectric material 1032, 1040 can be orthogonal to the poling direction of the shear-polarized transducer 1026. Compressional waves propagating from transducer 1026 into surface 1022 through polarizer 1024 can couple with the layers of piezoelectric material 1032, 1040 and the mechanical energy of the compressional wave can be converted to electrical energy (e.g., due to the orthogonal poling of the piezoelectric layers with respect to the displacement field of the compressional wave). The converted electrical energy can be transferred to electric circuits 1034, 1042 and can be dissipated (e.g., converted into heat). In some examples, the electric circuits 1034, 1042 can feed electrical energy back into the system at a different phase and can cancel out the incoming compressional wave. Shear waves propagating from transducer 1026 into surface 1022 through polarizer 1024 can pass through the layers of piezoelectric material 1032, 1040 without interacting and damping the shear waves.

Each of polarizer cells 1028, 1030 can include electrodes to couple a respective layer of piezoelectric material to a respective electric circuit. For example, electrodes 1036 and 1038 illustrated in stack-up 1020 can be used to couple electrical energy from the layer of piezoelectric material 1032 to electric circuit 1034 or to couple energy from the electric circuit 1034 to the layer of piezoelectric material 1032. Likewise, electrodes 1044 and 1046 can be used to couple together the layer of piezoelectric material 1040 and electric circuit 1042. Although FIG. 10B only illustrates electrodes for polarizer cells 1028, 1030, it should be understood that stack-up 1020 can also include electrodes for transducer 1026 to stimulate and/or receive acoustic energy. Additionally, although two electrodes are shown for each polarizer cell, it should be understood that in some examples, an electrode could be shared between polarizer cells (and/or between a polarizer cell and transducer 1026).

Figure 11C:
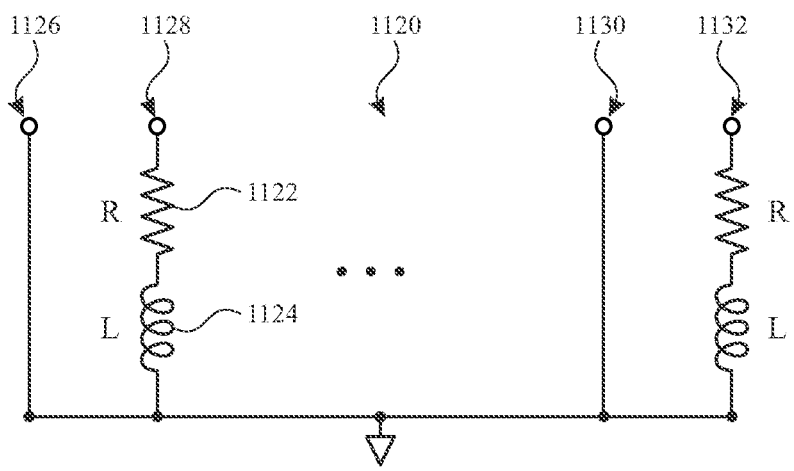
FIG. 11C illustrates an exemplary electric circuit representing multiple electric circuits for use with an exemplary multi-layer polarizer according to examples of the disclosure.

The respective electric circuits 1034, 1042 can be implemented with circuits like those illustrated in FIGS. 11A and 11B. In some examples, each polarizer cell in polarizer 1024 can use the same type of electric circuit. In some examples, different types of electric circuits can be used for different polarizer cells. FIG. 11C illustrates an exemplary electric circuit representing multiple electric circuits for use with an exemplary multi-layer polarizer according to examples of the disclosure. The exemplary circuit 1120 can correspond to the electric circuits 1034, 1042 of FIG. 10B, for example. In some examples, exemplary circuit 1120 can include terminals 1126, 1128, 1130, 1132 that can be coupled to electrodes 1036, 1038, 1044, 1046. For example, terminal 1132 can be coupled to electrode 1036, terminal 1130 can be coupled to electrode 1038, terminal 1128 can be coupled to electrode 1044 and terminal 1126 can be coupled to electrode 1046. FIG. 11C illustrates four terminals for two piezoelectric layers, but additional terminals and circuitry can be included in electric circuit 1120 for additional piezoelectric layers. Circuit 1120 can include a resistor 1122 and inductor 1124 coupled in series for each polarizer cell to dissipate electrical energy generated by compressional waves interacting with the piezoelectric material and to shift the phase of some electrical energy and feed the phase-shifted electrical energy back into the layer of piezoelectric material to dampen the compressional waves. In some examples, the inductor can be omitted. Although FIG. 11C includes resistors and/or inductors to convert electrical energy to heat or to phase shift and feedback electrical energy, other components can be used to convert electrical energy to heat and/or to phase shift and feedback electrical energy.

The efficiency of the damping of multi-cell polarizer 1024 can be characterized by the mechanical-to-electrical efficiency and electrical-to-heat efficiency of each of the polarizer cells. For example, polarizer cell 1030 can include a layer of PZT with a mechanical-to-electrical efficiency of 70% coupled to an electric circuit (e.g., including a resistor) with an electrical-to-heat efficiency of 70% that can attenuate compressional energy by approximately 49%. Polarizer cell 1028 can be identical and can attenuate the compressional energy by approximately 49%, such that a two-cell polarizer can attenuate compressional energy by approximately 74%. Adding an additional polarizer cell of the same type could provide a three-cell polarizer with the ability to attenuate approximately 86% of the compressional energy. Including inductors can further attenuate compressional energy by canceling at least a portion of the incoming compressional wave.

In some examples, each polarizer cell can be the same (as described above). In some examples, polarizer cells can be different. For example, different polarizer cells can use the same or different materials of the same or different thicknesses along with an electric circuit using the same or different resistance and/or inductance values. The type of material, thickness, resistance and inductance can be used to determine the filtering characteristic of the polarizer cell. Whether the polarizer cells are the same or different, the type of material, thickness, resistance and inductance can be selected or optimized to produce the desired filter performance from the polarizer.

Figure 12:
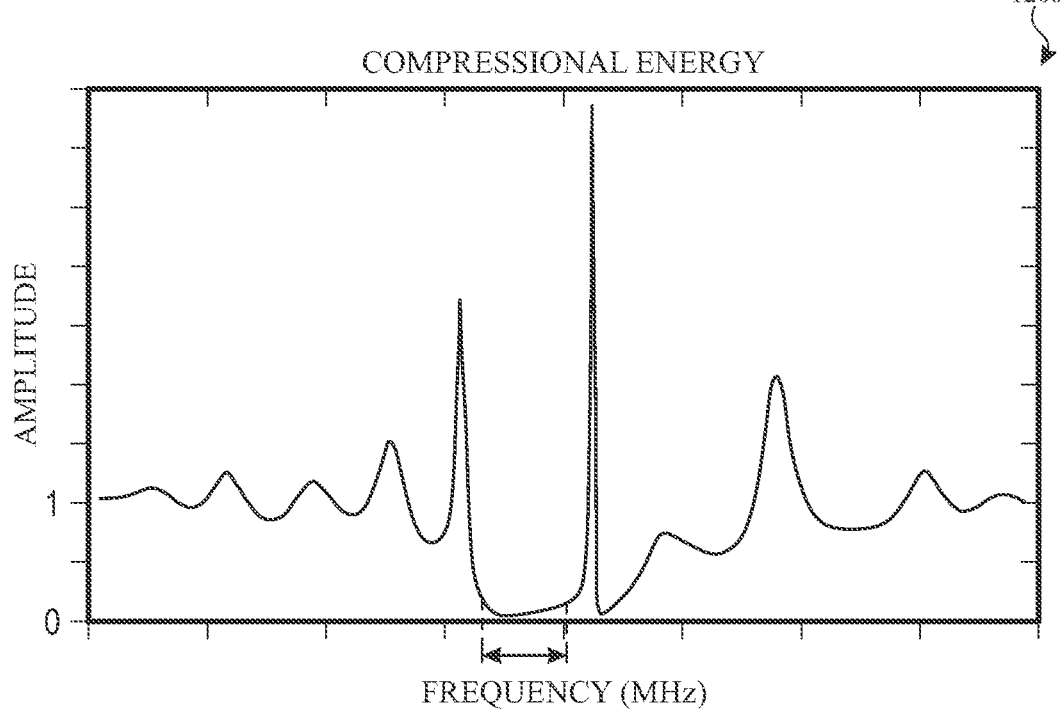
FIG. 12 illustrates exemplary performance of a polarizer according to examples of the disclosure.

FIG. 12 illustrates exemplary performance of a polarizer according to examples of the disclosure. For example, plot 1200 illustrates the amplitude of compressional energy for a polarizer formed of multiple polarizer cells. Each polarizer cell can be formed of the same type of piezoelectric material of the same thickness, and each polarizer cell can have one electrode coupled to ground and one electrode coupled to a circuit including a series inductor (e.g., of 200 nH) and resistor (e.g., 10 ohms) to ground. As illustrated in plot 1200, the compressional energy can be nearly zero in the bandwidth shown by the arrows. Operating the transducer to generate shear waves in this bandwidth can result in filtering out or otherwise suppressing compressional energy. In some examples, the bandwidth can be defined where the compressional energy output through the polarizer (transmission efficiency) is below a threshold (e.g., less than 10%, 5%, 1% of the compressional energy passing through the polarizer). The bandwidth can be designed to occur at relatively high frequencies (e.g., within a center frequency between 1 MHz and 10 MHz). The bandwidth, in some examples, can be greater than 50 kHz. In some examples, that bandwidth can be between 500 kHz–1 MHz.

In some examples, the thickness of the polarizer or the thickness of layers of piezoelectric material in multiple polarize cells can be selected such that the resonant frequency of the polarizer (or polarizer cell) matches the resonant frequency of the respective electric circuit. Matching the resonant frequency can improve the damping of the energy of the displacement field to be filtered out (e.g., compressional energy).

Magneto-elastic Piezoelectric Polarizer

Figure 13:
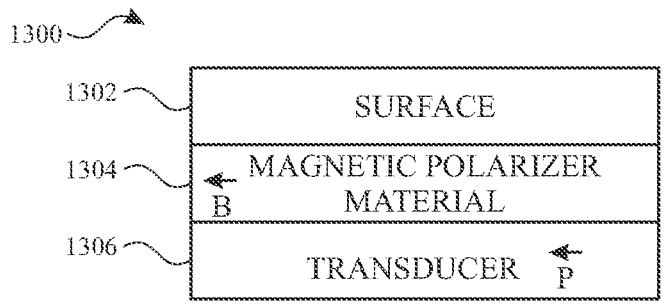
FIG. 13 illustrates a stack-up of an exemplary magneto-elastic polarizer according to examples of the disclosure.

In some examples, a magneto-elastic polarizer can be used. FIG. 13 illustrates a stack-up 1300 of an exemplary magneto-elastic polarizer according to examples of the disclosure. For example, stack-up 1300 can include a polarizer 1304 disposed between surface 1302 and transducer 1306. Transducer 1306 can be formed from a piezoelectric material (e.g., PZT, KNN, PVDF, PLLA, etc.) and can be shear-polarized (in the poling direction shown by the arrow in transducer 1306) such that transducer 1306 can generate, when stimulated, shear waves which propagate in the z-direction toward surface 1302, but whose field displacement is orthogonal to the direction of propagation (e.g., in-plane). As described herein, transducer 1306 may also generate some compressional waves whose field displacement is in the same direction as the direction of propagation (in the z-direction). Polarizer 1304 can be designed to filter out these compressional waves, which may interact with water.

Polarizer 1304 can be formed of a magnetic or ferromagnetic material (e.g., neodymium, FINEMET, etc.) having a magnetic field in the direction indicated by the arrow in polarizer 1304. When an elastic wave propagates in a conductive material, induced eddy currents can be generated according to the following equation $$J = \eta\left(E + \frac{\partial u}{\partial t} \times B_0\right),$$

where J can correspond to the eddy current density, E can correspond to an applied electric field (zero in this case) and u can correspond to the displacement field vector and B can correspond to the magnetic field. This mathematical relation means that a first displacement field parallel to the magnetic field can induce zero current, whereas a second displacement field perpendicular to the magnetic field can introduce strong eddy currents that can dampen energy with the second displacement field. Thus, for example, shear-polarized transducer 1306 can generate shear waves with a displacement field parallel to the magnetic field of polarizer 1304 to allow shear waves to pass, whereas compressional waves with a displacement field perpendicular to the magnetic field of polarizer 1304 can generate eddy currents that can convert the mechanical compressional energy to heat through Joule heating. Joule heating, however, can have a relatively low efficiency when compared with the mechanical-to-electrical efficiency and electrical-to-heat efficiency of the electro-elastic polarizers of FIGS. 10A, 10B.

In some examples, the conductivity of the magnetic or ferromagnetic material can be adjusted for improved damping. If conductivity of the magnetic or ferromagnetic material is mismatch from the optimal conductivity (e.g., too high or too low), the damping effect can be reduced. The conductivity can be a function of frequency and material properties including, type of material and geometry. Calculations and/or simulations can be used such that the conductivity of the magneto-elastic polarizer can be optimized for improved damping of compressional waves.

Therefore, according to the above, some examples of the disclosure are directed to a polarizer for use with a shear-polarized transducer. The polarizer can comprise a plurality of layers including at least a first layer of a first type of material and a second layer of a second type of material different than the first type of material. A transmission coefficient of the polarizer for shear waves at one or more first frequencies in a first passband can be greater than a first threshold and a transmission coefficient of the polarizer for compressional waves at the one or more first frequencies in the first passband can be less than a second threshold less than the first threshold. Additionally or alternatively to one or more of the examples disclosed above, in some examples, the first layer can have a first thickness and the second layer can have a second thickness different than the first thickness. Additionally or alternatively to one or more of the examples disclosed above, in some examples, the first type of material can have a Young's modulus less than or equal to 5 GPa and the second type of material can have a Young's modulus greater than or equal to 20 GPa. Additionally or alternatively to one or more of the examples disclosed above, in some examples, the first type of material can be an epoxy and the second type of material can be a metal. Additionally or alternatively to one or more of the examples disclosed above, in some examples, the plurality of layers can further include at least a third layer of a third type of material and a fourth layer of a fourth type of material different from the third type of material. The fourth layer can be disposed on the third layer, the third layer can be disposed on the second layer, and the second layer can be disposed on the first layer. Additionally or alternatively to one or more of the examples disclosed above, in some examples, the third type of material can be a same type of material as the first type of material and the fourth type of material can be a same type of material as the second type of material. Additionally or alternatively to one or more of the examples disclosed above, in some examples, the third type of material can be a different type of material than the first type of material or the fourth type of material can be a different type of material than the second type of material. Additionally or alternatively to one or more of the examples disclosed above, in some examples, the third layer can have a third thickness and the fourth layer can have a fourth thickness different than the third thickness. Additionally or alternatively to one or more of the examples disclosed above, in some examples, the third thickness can be a same thickness as the first thickness and the fourth thickness can be a same thickness as the second thickness. Additionally or alternatively to one or more of the examples disclosed above, in some examples, the third thickness can be a different thickness than the first thickness or the fourth thickness can be a different thickness than the second thickness. Additionally or alternatively to one or more of the examples disclosed above, in some examples, the plurality of layers can comprise interleaved layers with a Young's modulus less than or equal to 5 GPa and layers with a Young's modulus greater than or equal to 20 GPa. Additionally or alternatively to one or more of the examples disclosed above, in some examples, the first threshold can be greater than or equal to 50%. Additionally or alternatively to one or more of the examples disclosed above, in some examples, the second threshold can be less than or equal to 10%. Additionally or alternatively to one or more of the examples disclosed above, in some examples, the first passband can be wider than 100 kHz. Additionally or alternatively to one or more of the examples disclosed above, in some examples, the first passband can begin at a frequency greater than 500 kHz. Additionally or alternatively to one or more of the examples disclosed above, in some examples, the transmission coefficient of the polarizer for the compressional waves at one or more second frequencies in a second passband can be greater than a third threshold and the transmission coefficient of the polarizer for the shear waves at the one or more second frequencies in the second passband can be less than a fourth threshold less than the third threshold. Additionally or alternatively to one or more of the examples disclosed above, in some examples, the first passband and the second passband can separated by a threshold amount. Additionally or alternatively to one or more of the examples disclosed above, in some examples, the threshold amount can be at least 50 kHz.

Some examples of the disclosure are directed to an acoustic touch sensing system. The acoustic touch sensing system can comprise a surface, one or more shear-polarized transducers, and one or more polarizers. Each of the one or more polarizers can be disposed between a corresponding one of the one or more shear-polarized transducers and the surface. Each of the one or more polarizers can have a first passband for shear waves and a second passband for compressional waves. The one or more shear-polarized transducers can be configured to operate at a frequency within the first passband. Additionally or alternatively to one or more of the examples disclosed above, in some examples, the one or more polarizers can comprise at least a one polarizer with a plurality of layers including at least a first layer of a first type of material and a second layer of a second type of material different than the first type of material. Additionally or alternatively to one or more of the examples disclosed above, in some examples, the first layer can have a first thickness and the second layer can have a second thickness different than the first thickness. Additionally or alternatively to one or more of the examples disclosed above, in some examples, the first type of material can have a Young's modulus less than or equal to 5 GPa and the second type of material can have a Young's modulus greater than or equal to 20 GPa. Additionally or alternatively to one or more of the examples disclosed above, in some examples, the first type of material can be an epoxy and the second type of material can be a metal. Additionally or alternatively to one or more of the examples disclosed above, in some examples, the plurality of layers can further include at least a third layer of a third type of material and a fourth layer of a fourth type of material different from the third type of material. The fourth layer can be disposed on the third layer, the third layer can be disposed on the second layer, and the second layer can be disposed on the first layer. Additionally or alternatively to one or more of the examples disclosed above, in some examples, the third type of material can be a same type of material as the first type of material and the fourth type of material can be a same type of material as the second type of material. Additionally or alternatively to one or more of the examples disclosed above, in some examples, the third type of material can be a different type of material than the first type of material or the fourth type of material can be a different type of material than the second type of material. Additionally or alternatively to one or more of the examples disclosed above, in some examples, the third layer can have a third thickness and the fourth layer can have a fourth thickness different than the third thickness. Additionally or alternatively to one or more of the examples disclosed above, in some examples, the third thickness can be a same thickness as the first thickness and the fourth thickness can be a same thickness as the second thickness. Additionally or alternatively to one or more of the examples disclosed above, in some examples, the third thickness can be a different thickness than the first thickness or the fourth thickness can be a different thickness than the second thickness. Additionally or alternatively to one or more of the examples disclosed above, in some examples, the plurality of layers can comprise interleaved layers with a Young's modulus less than or equal to 5 GPa and layers with a Young's modulus greater than or equal to 20 GPa. Additionally or alternatively to one or more of the examples disclosed above, in some examples, the at least one polarizer can have a transmission coefficient for shear waves at one or more first frequencies in the first passband for shear waves greater than a first threshold and can have a transmission coefficient of for compressional waves at the one or more first frequencies in the first passband less than a second threshold less than the first threshold. Additionally or alternatively to one or more of the examples disclosed above, in some examples, the first threshold can be greater than or equal to 50%. Additionally or alternatively to one or more of the examples disclosed above, in some examples, the second threshold can be less than or equal to 10%. Additionally or alternatively to one or more of the examples disclosed above, in some examples, the first passband can be wider than 100 kHz. Additionally or alternatively to one or more of the examples disclosed above, in some examples, the first passband can begin at a frequency greater than 500 kHz. Additionally or alternatively to one or more of the examples disclosed above, in some examples, the transmission coefficient of the polarizer for the compressional waves at one or more second frequencies in a second passband can be greater than a third threshold and the transmission coefficient of the polarizer for the shear waves at the one or more second frequencies in the second passband can be less than a fourth threshold less than the third threshold. Additionally or alternatively to one or more of the examples disclosed above, in some examples, the first passband and the second passband can separated by a threshold amount. Additionally or alternatively to one or more of the examples disclosed above, in some examples, the threshold amount can be at least 50 kHz.

Some examples of the disclosure are directed to a device. The device can comprise a housing, a crystal surface, one or more shear-polarized transducers, one or more polarizers, and a processor. Each of the one or more polarizers can be disposed between a corresponding one of the one or more shear-polarized transducers and the surface. Each of the one or more polarizers can have a first passband for shear waves and a second passband for compressional waves. The processor can be coupled to the one or more shear-polarized transducers and configured to stimulate the one or more shear-polarized transducers at one or more frequencies within the first passband and determine a location of an object based on reflected acoustic energy from the crystal surface. Additionally or alternatively to one or more of the examples disclosed above, in some examples, the one or more polarizers can comprise at least a one polarizer with a plurality of layers including at least a first layer of a first type of material and a second layer of a second type of material different than the first type of material. Additionally or alternatively to one or more of the examples disclosed above, in some examples, the first layer can have a first thickness and the second layer can have a second thickness different than the first thickness. Additionally or alternatively to one or more of the examples disclosed above, in some examples, the first type of material can have a Young's modulus less than or equal to 5 GPa and the second type of material can have a Young's modulus greater than or equal to 20 GPa. Additionally or alternatively to one or more of the examples disclosed above, in some examples, the first type of material can be an epoxy and the second type of material can be a metal. Additionally or alternatively to one or more of the examples disclosed above, in some examples, the plurality of layers can further include at least a third layer of a third type of material and a fourth layer of a fourth type of material different from the third type of material. The fourth layer can be disposed on the third layer, the third layer can be disposed on the second layer, and the second layer can be disposed on the first layer. Additionally or alternatively to one or more of the examples disclosed above, in some examples, the third type of material can be a same type of material as the first type of material and the fourth type of material can be a same type of material as the second type of material. Additionally or alternatively to one or more of the examples disclosed above, in some examples, the third type of material can be a different type of material than the first type of material or the fourth type of material can be a different type of material than the second type of material. Additionally or alternatively to one or more of the examples disclosed above, in some examples, the third layer can have a third thickness and the fourth layer can have a fourth thickness different than the third thickness. Additionally or alternatively to one or more of the examples disclosed above, in some examples, the third thickness can be a same thickness as the first thickness and the fourth thickness can be a same thickness as the second thickness. Additionally or alternatively to one or more of the examples disclosed above, in some examples, the third thickness can be a different thickness than the first thickness or the fourth thickness can be a different thickness than the second thickness. Additionally or alternatively to one or more of the examples disclosed above, in some examples, the plurality of layers can comprise interleaved layers with a Young's modulus less than or equal to 5 GPa and layers with a Young's modulus greater than or equal to 20 GPa. Additionally or alternatively to one or more of the examples disclosed above, in some examples, the at least one polarizer can have a transmission coefficient for shear waves at one or more first frequencies in the first passband for shear waves greater than a first threshold and can have a transmission coefficient of for compressional waves at the one or more first frequencies in the first passband less than a second threshold less than the first threshold. Additionally or alternatively to one or more of the examples disclosed above, in some examples, the first threshold can be greater than or equal to 50%. Additionally or alternatively to one or more of the examples disclosed above, in some examples, the second threshold can be less than or equal to 10%. Additionally or alternatively to one or more of the examples disclosed above, in some examples, the first passband can be wider than 100 kHz. Additionally or alternatively to one or more of the examples disclosed above, in some examples, the first passband can begin at a frequency greater than 500 kHz. Additionally or alternatively to one or more of the examples disclosed above, in some examples, the transmission coefficient of the polarizer for the compressional waves at one or more second frequencies in a second passband can be greater than a third threshold and the transmission coefficient of the polarizer for the shear waves at the one or more second frequencies in the second passband can be less than a fourth threshold less than the third threshold. Additionally or alternatively to one or more of the examples disclosed above, in some examples, the first passband and the second passband can separated by a threshold amount. Additionally or alternatively to one or more of the examples disclosed above, in some examples, the threshold amount can be at least 50 kHz.

Some examples of the disclosure are directed to a multi-dimensional polarizer for use with a shear-polarized transducer. The multi-dimensional polarizer can comprise a multi-dimensional pattern of a first type of material embedded within a second type of material different than the first type of material. A transmission coefficient of the polarizer for shear waves at one or more first frequencies in a first passband can be greater than a first threshold and a transmission coefficient of the polarizer for compressional waves at the one or more first frequencies in the first passband can be less than a second threshold less than the first threshold.

Some examples of the disclosure are directed to a polarizer for use with a shear-polarized transducer. The polarizer can comprise one or more layers of piezoelectric material, one or more electrodes, and one or more circuits coupled to the one or more layers of piezoelectric material via the one or more electrodes. The polarizer can be configured to extract and dissipate energy of compressional waves and pass energy of shear waves. Additionally or alternatively to one or more of the examples disclosed above, in some examples, each of the one or more layers of piezoelectric material can have a poling direction different than a poling direction of the shear-polarized transducer. Additionally or alternatively to one or more of the examples disclosed above, in some examples, the poling direction of each of the one or more layers of piezoelectric material can be orthogonal to the poling direction of the shear-polarized transducer. Additionally or alternatively to one or more of the examples disclosed above, in some examples, the one or more electrodes can comprise a first electrode on a first side of a first layer of piezoelectric material of the one or more layers of piezoelectric material and a second electrode on a second side, opposite the first side, of the first layer of the piezoelectric material. Additionally or alternatively to one or more of the examples disclosed above, in some examples, the one or more circuits can comprise a circuit comprising a resistor coupled between one of the one or more electrodes and a system ground. Additionally or alternatively to one or more of the examples disclosed above, in some examples, the one or more circuits can comprise a circuit comprising a resistor and an inductor coupled in series between one of the one or more electrodes and a system ground. Additionally or alternatively to one or more of the examples disclosed above, in some examples, the one or more circuits can comprise a circuit comprising one or more passive electric components or one or more active electric components coupled in series between one of the one or more electrodes and a system ground. Additionally or alternatively to one or more of the examples disclosed above, in some examples, the one or more circuits can comprise a circuit comprising one or more passive electric components and one or more active electric components coupled in series between one of the one or more electrodes and a system ground. Additionally or alternatively to one or more of the examples disclosed above, in some examples, a first layer of piezoelectric material of the one or more layers of piezoelectric material can have a first thickness and a second layer of piezoelectric material of the one or more layers of piezoelectric material can have a second thickness different than the first thickness. Additionally or alternatively to one or more of the examples disclosed above, in some examples, a first layer of piezoelectric material of the one or more layers of piezoelectric material and a second layer of piezoelectric material of the one or more layers of piezoelectric material can be formed from a same type of material. Additionally or alternatively to one or more of the examples disclosed above, in some examples, a first layer of piezoelectric material of the one or more layers of piezoelectric material and a second layer of piezoelectric material of the one or more layers of piezoelectric material can be formed from different types of material. Additionally or alternatively to one or more of the examples disclosed above, in some examples, extracting and dissipating energy of the compressional waves can comprise attenuating compressional waves by a threshold amount within at least a first range of frequencies. Additionally or alternatively to one or more of the examples disclosed above, in some examples, the threshold amount can be at least 90% attenuation. Additionally or alternatively to one or more of the examples disclosed above, in some examples, the first range of frequencies can be wider than 100 kHz and includes frequencies greater than 500 kHz.

Some examples of the disclosure are directed to an acoustic touch sensing system. The acoustic touch sensing system can comprise a surface, one or more shear-polarized transducers, and one or more polarizers configured to extract and dissipate energy of compressional waves and pass energy of shear waves. Each of the one or more polarizers can be disposed between a corresponding one of the one or more shear-polarized transducers and the surface. At least one of the one or more polarizers can comprise: one or more layers of piezoelectric material, one or more electrodes, and one or more circuits coupled to the one or more layers of piezoelectric material via the one or more electrodes. Additionally or alternatively to one or more of the examples disclosed above, in some examples, each of the one or more layers of piezoelectric material of the at least one of the one or more polarizers can have a poling direction different than a poling direction of the corresponding one of the one or more shear-polarized transducer. Additionally or alternatively to one or more of the examples disclosed above, in some examples, the poling direction of each of the one or more layers of piezoelectric material of the at least one of the one or more polarizers can be orthogonal to the poling direction of the shear-polarized transducer. Additionally or alternatively to one or more of the examples disclosed above, in some examples, the one or more electrodes of the at least one of the one or more polarizers can comprise a first electrode on a first side of a first layer of piezoelectric material of the one or more layers of piezoelectric material and a second electrode on a second side, opposite the first side, of the first layer of the piezoelectric material. Additionally or alternatively to one or more of the examples disclosed above, in some examples, the one or more circuits of the at least one of the one or more polarizers can comprise a circuit comprising a resistor coupled between one of the one or more electrodes and a system ground. Additionally or alternatively to one or more of the examples disclosed above, in some examples, the one or more circuits of the at least one of the one or more polarizers can comprise a circuit comprising a resistor and an inductor coupled in series between one of the one or more electrodes and a system ground. Additionally or alternatively to one or more of the examples disclosed above, in some examples, the one or more circuits of the at least one of the one or more polarizers can comprise a circuit comprising one or more passive electric components or one or more active electric components coupled in series between one of the one or more electrodes and a system ground. Additionally or alternatively to one or more of the examples disclosed above, in some examples, the one or more circuits of the at least one of the one or more polarizers can comprise a circuit comprising one or more passive electric components and one or more active electric components coupled in series between one of the one or more electrodes and a system ground. Additionally or alternatively to one or more of the examples disclosed above, in some examples, a first layer of piezoelectric material of the one or more layers of piezoelectric material of the at least one of the one or more polarizers can have a first thickness and a second layer of piezoelectric material of the one or more layers of piezoelectric material of the at least one of the one or more polarizers can have a second thickness different than the first thickness. Additionally or alternatively to one or more of the examples disclosed above, in some examples, a first layer of piezoelectric material of the one or more layers of piezoelectric material of the at least one of the one or more polarizers and a second layer of piezoelectric material of the one or more layers of piezoelectric material of the at least one of the one or more polarizers can be formed from a same type of material. Additionally or alternatively to one or more of the examples disclosed above, in some examples, a first layer of piezoelectric material of the one or more layers of piezoelectric material of the at least one of the one or more polarizers and a second layer of piezoelectric material of the one or more layers of piezoelectric material of the at least one of the one or more polarizers can be formed from different types of material. Additionally or alternatively to one or more of the examples disclosed above, in some examples, extracting and dissipating energy of the compressional waves can comprise attenuating compressional waves by a threshold amount within at least a first range of frequencies. Additionally or alternatively to one or more of the examples disclosed above, in some examples, the threshold amount can be at least 90% attenuation. Additionally or alternatively to one or more of the examples disclosed above, in some examples, the first range of frequencies can be wider than 100 kHz and includes frequencies greater than 500 kHz.

Therefore, according to the above, some examples of the disclosure are directed to a device. The device can comprise a housing; a crystal surface; one or more shear-polarized transducers; one or more polarizers configured to extract and dissipate energy of compressional waves and pass energy of shear waves; and one or more processors. Each of the one or more polarizers can be disposed between a corresponding one of the one or more shear-polarized transducers and the surface. At least one of the one or more polarizers can comprises: one or more layers of piezoelectric material; one or more electrodes; and one or more circuits coupled to the one or more layers of piezoelectric material via the one or more electrodes. The processor can be coupled to the one or more shear-polarized transducers and can be configured to stimulate the one or more shear-polarized transducers at one or more frequencies within the first passband and determine a location of an object based on reflected acoustic energy from the crystal surface. Additionally or alternatively to one or more of the examples disclosed above, in some examples, each of the one or more layers of piezoelectric material of the at least one of the one or more polarizers can have a poling direction different than a poling direction of the corresponding one of the one or more shear-polarized transducer. Additionally or alternatively to one or more of the examples disclosed above, in some examples, the poling direction of each of the one or more layers of piezoelectric material of the at least one of the one or more polarizers can be orthogonal to the poling direction of the shear-polarized transducer. Additionally or alternatively to one or more of the examples disclosed above, in some examples, the one or more electrodes of the at least one of the one or more polarizers can comprise a first electrode on a first side of a first layer of piezoelectric material of the one or more layers of piezoelectric material and a second electrode on a second side, opposite the first side, of the first layer of the piezoelectric material. Additionally or alternatively to one or more of the examples disclosed above, in some examples, the one or more circuits of the at least one of the one or more polarizers can comprise a circuit comprising a resistor coupled between one of the one or more electrodes and a system ground. Additionally or alternatively to one or more of the examples disclosed above, in some examples, the one or more circuits of the at least one of the one or more polarizers can comprise a circuit comprising a resistor and an inductor coupled in series between one of the one or more electrodes and a system ground. Additionally or alternatively to one or more of the examples disclosed above, in some examples, the one or more circuits of the at least one of the one or more polarizers can comprise a circuit comprising one or more passive electric components or one or more active electric components coupled in series between one of the one or more electrodes and a system ground. Additionally or alternatively to one or more of the examples disclosed above, in some examples, the one or more circuits of the at least one of the one or more polarizers can comprise a circuit comprising one or more passive electric components and one or more active electric components coupled in series between one of the one or more electrodes and a system ground. Additionally or alternatively to one or more of the examples disclosed above, in some examples, a first layer of piezoelectric material of the one or more layers of piezoelectric material of the at least one of the one or more polarizers can have a first thickness and a second layer of piezoelectric material of the one or more layers of piezoelectric material of the at least one of the one or more polarizers can have a second thickness different than the first thickness. Additionally or alternatively to one or more of the examples disclosed above, in some examples, a first layer of piezoelectric material of the one or more layers of piezoelectric material of the at least one of the one or more polarizers and a second layer of piezoelectric material of the one or more layers of piezoelectric material of the at least one of the one or more polarizers can be formed from a same type of material. Additionally or alternatively to one or more of the examples disclosed above, in some examples, a first layer of piezoelectric material of the one or more layers of piezoelectric material of the at least one of the one or more polarizers and a second layer of piezoelectric material of the one or more layers of piezoelectric material of the at least one of the one or more polarizers can be formed from different types of material. Additionally or alternatively to one or more of the examples disclosed above, in some examples, extracting and dissipating energy of the compressional waves can comprise attenuating compressional waves by a threshold amount within at least a first range of frequencies. Additionally or alternatively to one or more of the examples disclosed above, in some examples, the threshold amount can be at least 90% attenuation. Additionally or alternatively to one or more of the examples disclosed above, in some examples, the first range of frequencies can be wider than 100 kHz and includes frequencies greater than 500 kHz.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. A polarizer for use with a shear-polarized transducer, the polarizer comprising:
   a plurality of layers including at least a first layer of a first type of material and a second layer of a second type of material different than the first type of material;
   wherein a transmission coefficient of the polarizer for shear waves at one or more first frequencies in a first passband is greater than a first threshold and wherein a transmission coefficient of the polarizer for compressional waves at the one or more first frequencies in the first passband is less than a second threshold less than the first threshold.

2. The polarizer of claim 1, wherein the first layer has a first thickness and the second layer has a second thickness different than the first thickness.

3. The polarizer of claim 1, wherein the first type of material has a Young's modulus less than or equal to 5 GPa and the second type of material has a Young's modulus greater than or equal to 20 GPa.

4. The polarizer of claim 1, wherein the first type of material is an epoxy and the second type of material is a metal.

5. The polarizer of claim 1, the plurality of layers further including at least a third layer of a third type of material and a fourth layer of a fourth type of material different from the third type of material, wherein the fourth layer is disposed on the third layer, the third layer is disposed on the second layer, and the second layer is disposed on the first layer.

6. The polarizer of claim 5, wherein the third type of material is a same type of material as the first type of material and the fourth type of material is a same type of material as the second type of material.

7. The polarizer of claim 5, wherein the third type of material is a different type of material than the first type of material or the fourth type of material is a different type of material than the second type of material.

8. The polarizer of claim 5, wherein the third layer has a third thickness and the fourth layer has a fourth thickness different than the third thickness.

9. The polarizer of claim 1, wherein the plurality of layers comprises interleaved layers with a Young's modulus less than or equal to 5 GPa and layers with a Young's modulus greater than or equal to 20 GPa.

10. The polarizer of claim 1, wherein the transmission coefficient of the polarizer for the compressional waves at one or more second frequencies in a second passband is greater than a third threshold and wherein the transmission coefficient of the polarizer for the shear waves at the one or more second frequencies in the second passband is less than a fourth threshold less than the third threshold.

11. A polarizer for use with a shear-polarized transducer, the polarizer comprising:
   one or more layers of piezoelectric material, wherein each of the one or more layers of piezoelectric material has a poling direction different than a poling direction of the shear-polarized transducer;
   one or more electrodes; and
   one or more circuits coupled to the one or more layers of piezoelectric material via the one or more electrodes;
   wherein the polarizer is configured to extract and dissipate energy of compressional waves and pass energy of shear waves.

12. The polarizer of claim 11, wherein extracting and dissipating energy of the compressional waves comprises attenuating compressional waves by a threshold amount within at least a first range of frequencies.

13. The polarizer of claim 11, wherein the poling direction of each of the one or more layers of piezoelectric material is orthogonal to the poling direction of the shear-polarized transducer.

14. The polarizer of claim 11, wherein the one or more electrodes comprises a first electrode on a first side of a first layer of piezoelectric material of the one or more layers of piezoelectric material and a second electrode on a second side, opposite the first side, of the first layer of the piezoelectric material.

15. The polarizer of claim 11, wherein the one or more circuits comprise a circuit comprising a resistor coupled between one of the one or more electrodes and a system ground.

16. The polarizer of claim 11, wherein the one or more circuits comprise a circuit comprising a resistor and an inductor coupled in series between one of the one or more electrodes and a system ground.

17. The polarizer of claim 11, wherein a first layer of piezoelectric material of the one or more layers of piezoelectric material has a first thickness and a second layer of piezoelectric material of the one or more layers of piezoelectric material has a second thickness different than the first thickness.

18. A polarizer for use with a shear-polarized transducer, the polarizer comprising:
   one or more layers of piezoelectric material;
   one or more electrodes; and
   one or more circuits coupled to the one or more layers of piezoelectric material via the one or more electrodes;
   wherein the polarizer is configured to extract and dissipate energy of compressional waves and pass energy of shear waves, and wherein extracting and dissipating energy of the compressional waves comprises attenuating the compressional waves by a threshold amount within at least a first range of frequencies.

19. The polarizer of claim 18, wherein the threshold amount is at least 90% attenuation.

20. The polarizer of claim 18, wherein the first range of frequencies is wider than 100 kHz and includes frequencies greater than 500 kHz.

* * * * *

UNITED STATES PATENT AND TRADEMARK OFFICE
CERTIFICATE OF CORRECTION

PATENT NO. : 11,366,552 B2
APPLICATION NO. : 16/268886
DATED : June 21, 2022
INVENTOR(S) : Ehsan Khajeh et al.

It is certified that error appears in the above-identified patent and that said Letters Patent is hereby corrected as shown below:

On the Title Page

In Item (73) Assignee, delete "Apple," and insert --Apple--.

Signed and Sealed this
Sixteenth Day of August, 2022

Katherine Kelly Vidal
*Director of the United States Patent and Trademark Office*